United States Patent [19]

Tomonari et al.

[11] Patent Number: 5,426,412

[45] Date of Patent: Jun. 20, 1995

[54] INFRARED DETECTING DEVICE AND INFRARED DETECTING ELEMENT FOR USE IN THE DEVICE

[75] Inventors: Shigeaki Tomonari; Jun Sakai; Kouichi Aizawa; Keizi Kakite; Takayoshi Awai; Takuro Nakamura; Takuro Ishida; Tsutomu Ichihara; Hitoshi Yoshida; Shigenari Takami; Sadayuki Sumi, all of Kadoma, Japan

[73] Assignee: Matsushita Electric Works, Ltd., Osaka, Japan

[21] Appl. No.: 141,336

[22] Filed: Oct. 26, 1993

[30] Foreign Application Priority Data

| Oct. 27, 1992 | [JP] | Japan | 4-074816 |
| Oct. 27, 1992 | [JP] | Japan | 4-289129 |
| Mar. 26, 1993 | [JP] | Japan | 5-068121 |
| Apr. 28, 1993 | [JP] | Japan | 5-102396 |

[51] Int. Cl.⁶ .......................................... H01L 31/08
[52] U.S. Cl. ................................. 338/18; 338/225 D; 338/306; 250/338.1
[58] Field of Search .................. 338/18, 22 R, 225 D, 338/25, 306; 250/338.1, 214 PR

[56] References Cited

U.S. PATENT DOCUMENTS

| 3,684,996 | 8/1972 | Schwarz | 338/18 |
| 3,767,928 | 10/1973 | Bishop et al. | 250/338.1 |
| 5,302,933 | 4/1994 | Kudo et al. | 338/18 |

FOREIGN PATENT DOCUMENTS

| 58-170001 | 10/1983 | Japan. |
| 61-30730 | 2/1986 | Japan. |
| 3-78222 | 8/1991 | Japan. |
| 4-215022 | 8/1992 | Japan. |

Primary Examiner—Marvin M. Lateef
Attorney, Agent, or Firm—Burns, Doane, Swecker & Mathis

[57] ABSTRACT

An infrared detecting arrangement includes an infrared detecting element having a heat insulating film and an infrared detector which are disposed between an interior space of a hermetically sealed casing for the element and a cavity formed within a substrate of the element and communicating through a ventilator with the interior space.

13 Claims, 28 Drawing Sheets

INFRARED DETECTING DEVICE AND INFRARED DETECTING ELEMENT FOR USE IN THE DEVICE

BACKGROUND OF THE INVENTION

This invention relates to an infrared detecting arrangement and, more particularly, to an infrared detecting device and an infrared detecting element for use in the device.

DESCRIPTION OF RELATED ART

In conventional infrared detecting arrangements employing a thermal type infrared detecting element having a diaphragm structure, measures for improving the sensitivity of the infrared detecting element by attaining a vacuum in the interior of hermetically sealed casing or charging a thermally low conducting gas in the casing have been suggested. Further, the infrared detecting element of this kind is provided by an infrared detecting element on a substrate having a cavity and disposing an infrared detector on this infrared detecting element, so as to more improve the sensitivity to infrared light. For the infrared detector disposed on this element, a thermistor which varies electric resistance in response to variation in temperature has been used, and a practical example is an amorphous semiconductor (silicon) film.

As a prior art reference disclosing the infrared detecting arrangement, Japanese Utility Model Laid-Open Publication No. 3-78222 may be mentioned, and practical detecting elements have been disclosed in, for example, Japanese Patent Laid-Open Publications Nos. 58-170001, 61-30730 and 4-215022.

In order to attain an excellent detection sensitivity with these infrared detecting arrangements, it is desired to attain vacuum or to charge the thermally low conducting gas also in the cavity or hollow space made in the substrate in similar manner to the interior space of the hermetically sealed casing. Further, in exhausting the gas in the interior of the hermetically sealed casing, it is also desired to prevent the infrared detecting element and eventually the infrared detector on the film from being damaged by an excessive pressure difference between the interior space of the casing and the cavity included in the infrared detecting element since the film and detector are disposed between this space and cavity.

SUMMARY OF THE INVENTION

A primary object of the present invention is, therefore, to provide an infrared detecting device and an infrared detecting element employed in this device, which can at least reduce, but remarkably, the pressure difference between the interior space of the hermetically sealed casing of the device and the cavity formed in the substrate of the infrared detecting element, and thus can substantially eliminate any damaging stress applied to the heat insulating film and the infrared detector by the pressure difference.

According to the present invention, this object of the invention can be realized by an infrared detecting arrangement in which an infrared detecting element comprises a substrate defining therein a cavity, a heat insulation film provided on the substrate, and an infrared detector provided on the heat insulation film, and the thermally infrared absorbing film and infrared detector are disposed to be between an interior space of a hermetically sealed casing for accommodating therein the infrared detecting element and the cavity of the substrate, characterized in that the arrangement further includes means for communicating the cavity defined in the substrate of the infrared detecting element with the interior space of the hermetically sealed casing.

According to the above infrared detecting arrangement, sensitivity to infrared light which has been apt to be deteriorated in the conventional arrangement of the similar type for detecting infrared light can be extremely improved, as will be readily appreciated.

Other objects and advantages of the present invention shall become clear as the description of the invention detailed with reference to accompanying drawings in the followings advances.

The present invention shall now be described in details with reference to the respective embodiments shown in the accompanying drawings, but it should appreciated that the intention is not to limit the present invention only to these embodiments shown but rather to include all alterations, modifications and equivalent arrangements; possible within the scope of appended claims.

DETAILED DESCRIPTION OF THE PREFERRED EMBODIMENTS

Figure 1:
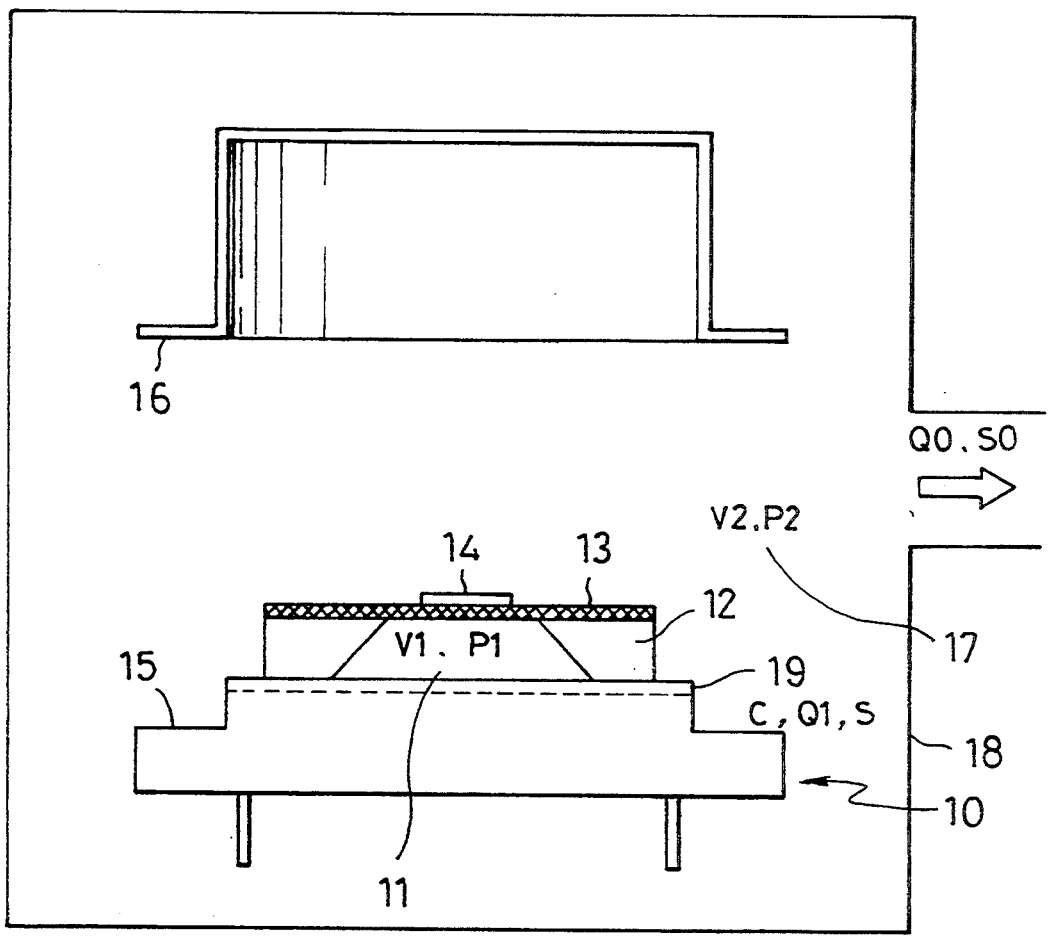
FIG. 1 is a schematic explanatory view of a infrared detecting device according to the present invention.
Figure 2:
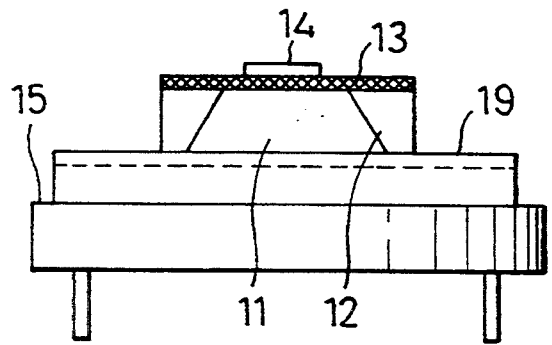
FIG. 2 is a schematic side view of the infrared detecting element in the device of FIG. 1.
Figure 3:
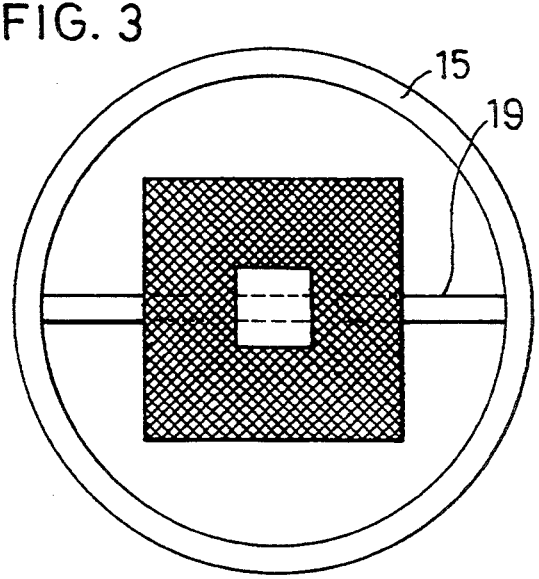
FIG. 3 is a schematic plan view of the element of FIG. 2.
Figure 4:
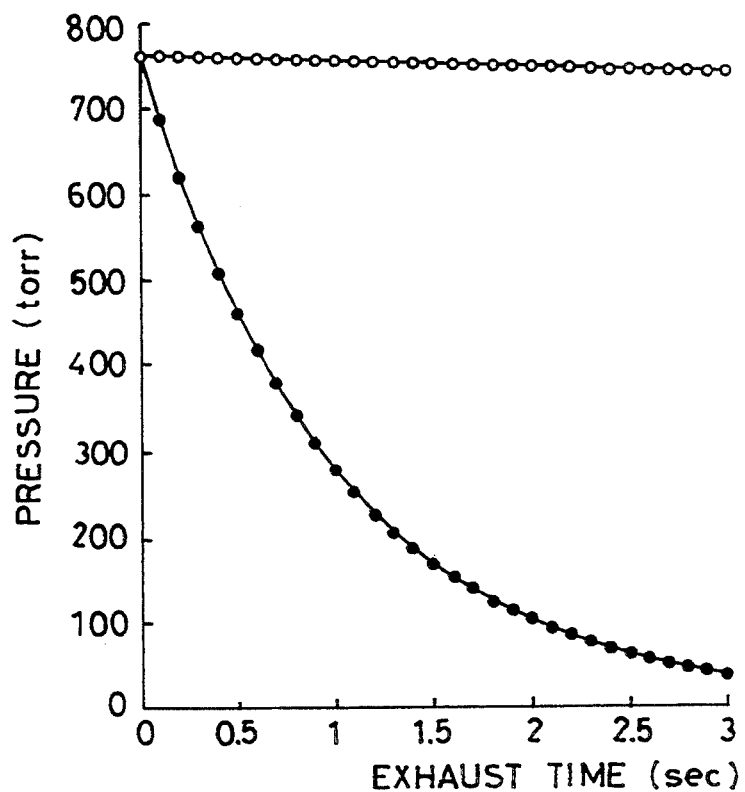
FIGS. 4 to 7 are graphic diagrams of varying relationship between gas exhaust time and pressure difference with the conductance of the communicating means varied in the device shown in FIG. 1.
Figure 5:
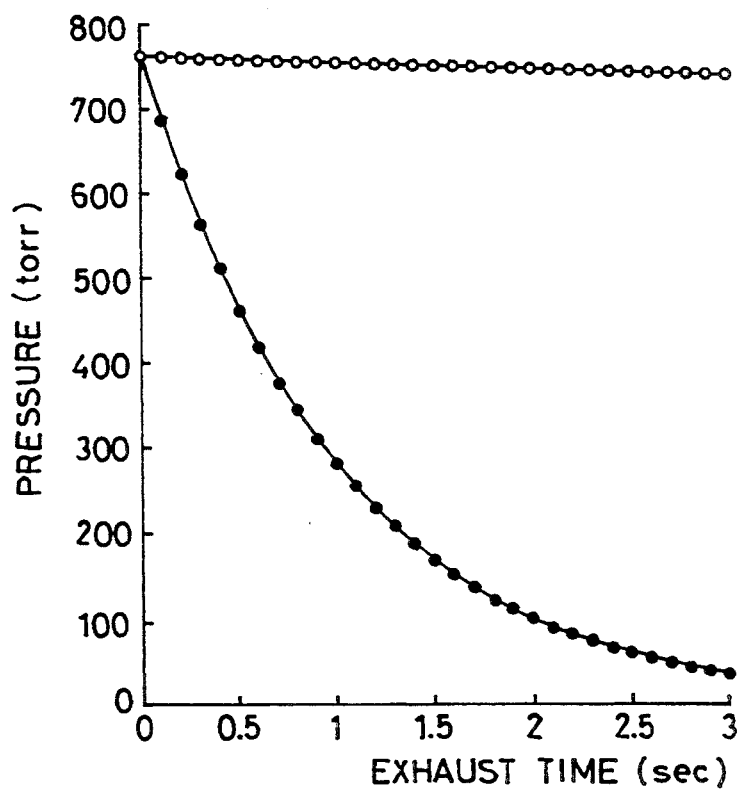
Figure 6:
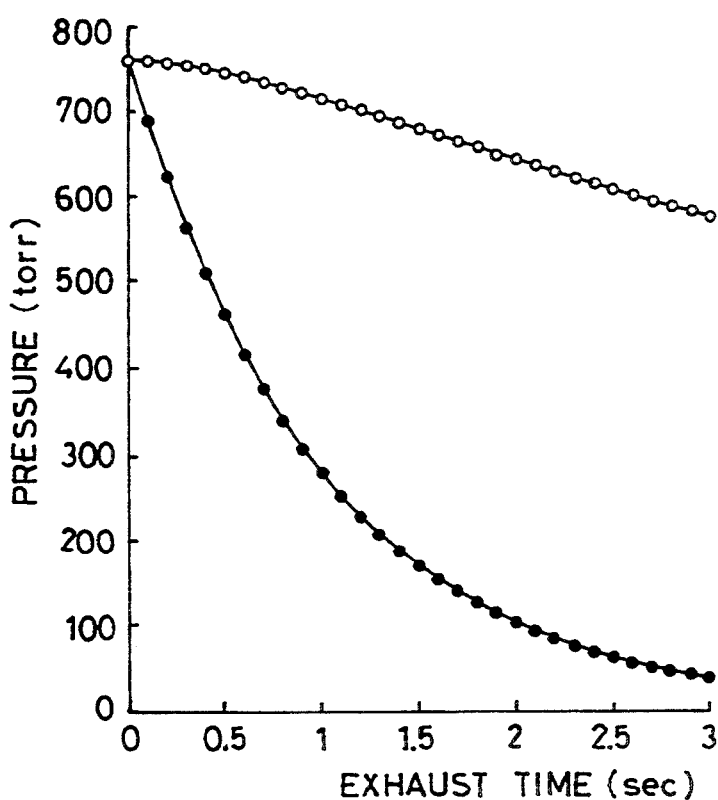
Figure 7:
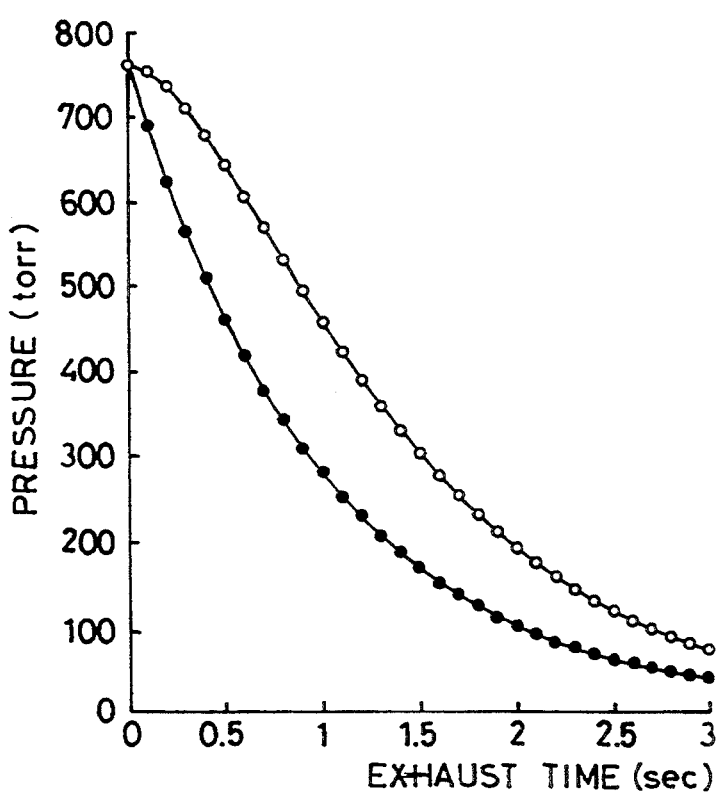

Referring to FIGS. 1 to 3, there is shown an embodiment of an infrared detecting device according to the present invention, in which the device includes an infrared detecting element 10 which comprises a substrate 12 having a cavity 11 defined therein, a heat insulation film 13 provided on the substrate 12 to cover the cavity 11, and an infrared detector 14 disposed on the heat insulation film 13. The substrate 12 is disposed preferably on a base plate 15 formed to have a peripheral stepped part, and a cap 16 is fitted over the base plate 15, while FIG. 1 shows them as separated. The cap 16 is joined to the peripheral stepped part of the base plate 15 by means of an electric welding or the like, to form a hermetically sealed casing. The infrared detecting device of the present invention is constituted in the following manner. The infrared detecting element 10 is accommodated within a hermetically sealed chamber 18 defining therein an interior space 17 attained the vacuum or charged with other gas of a low thermal conductivity than air. Here, the infrared detector 14 on the heat insulation film 13 is positioned to be between the cavity 11 formed in the substrate 12 and the interior space 17 defined in the chamber 18.

Further, the base plate 15 is formed to have a ventilator 19 in the form of a hole or groove made in the base plate 15, so that the cavity 11 in the substrate 12 can communicate with the interior space 17 of the chamber 18 through the ventilator 19. In this case, the ventilator 19 as the communicating means may be provided alternatively in a spacer disposed between the substrate 12 and the base plate 15. Then, the cap 16 is joined to the base plate 15 to form the casing within the hermetically sealed chamber 18, so that the infrared detecting element 10 will be sealed in the hermetical casing having the same atmosphere as the interior space of the chamber 18.

Assuming here that the gas inside the chamber 18 is to be exhausted at a flow rate Q0 and at an exhaust speed S0 in vacuum series, that the cavity 11 of the substrate 12 is of a volume V1 and a pressure P1 while the interior space 17 of the sealed chamber 18 is of a volume V2 and a pressure P2, and that the ventilator 19 between the cavity 11 and the interior space 17 is of a conductance C, a gas flow rate Q1 and an exhaust speed S, then there is satisfied between them such relationship as follows:

$$S \cdot P1 = Q1, \quad C(P2 - P1) = Q1$$

Further, variation in the pressure P2 inside the chamber 18 will be as follows:

$$V2(dP2/dt) = -S0 \cdot P2 + Q1$$

Provided that, normally, V2>>V1 and Q1 is negligibly small with respect to S0 and P2, then $$V2(dP2/dt) = -S0 \cdot P2$$

whereby, here initial pressure of interior space 17:P$\phi$ $$P2 = P\phi \exp(-S0 \cdot t / V2)$$

On the other hand, variation in the pressure P1 in the cavity 11 will be as follows:

$$V1(dP1/dt) = -S \cdot P1$$

Because, as in the above, $S \cdot P1 = Q1$ and $C(P2 - P1) = Q1$, $$V1(dP1/dt) = C(P2 - P1)$$

and hence, $$P1 = P2 + (P0 - P2) \exp(-Ct / V1)$$

in this expression coefficient(P$\phi$ − P2) is fixed as initial pressure in the cavity 11 equal P$\phi$. Consequently, the conductance C of the ventilator 19 is so set that P1 and P2 will be equal to each other. At this time, a tolerance limit of the pressure difference is determined by the pressure resisting break strength of the heat insulation film 13.

Referring more specifically to the above with reference to a practical example, it is assumed here that the infrared detecting element 10 and a vacuumizing exhaust system satisfying the conditions of S0 = 10 cm$^3$/S, V1 = 10$^{-3}$ cm$^3$ and V2 = 10 cm$^3$ are furnished, and the to heat insulation film 13 of the element 10 is formed by a silicon oxide film or a multi-layered film of a silicon oxide film and silicon nitride film and 1 μm thick, and this film is to be broken at the pressure difference of about 300 Torr. In this system, there is established such relationship of the gas exhaust time to the pressure difference between P1 of the cavity 11 and P2 of the interior space 17 at the time when the ventilator conductance C is 10$^{-6}$ cm$^3$/S, 10$^{-5}$ cm$^3$/S, 10$^{-4}$ cm$^3$/S and 10$^{-3}$ cm/S, respectively, as shown in FIGS. 4 to 7, in view of which the gas exhaust is made possible under the pressure difference of P1 and P2 below 300 Torr, when C is 10$^{-3}$ cm$^3$/S.

On the other hand, required size of the ventilator 19 for attaining the optimum conductance C will be determined as in the followings. That is, the viscous fluidity of a circular conduit in general is to be assumed as in the followings, $$D^4 = L \cdot C / 182p$$

Here, D is a diameter of the circular conduit, L is the length of the conduit, p is an average pressure of pressures at inlet and outlet ports of the conduit, and the conduit will have a sectional area of about 100 μm$^2$ when C=10$^{-3}$ cm$^3$/S, L=0.05 cm and p=380 Torr. In designing the ventilator 19, therefore, it is desirable that the ventilator is provided with a sectional area larger than this sectional area of the conduit.

Figure 8:
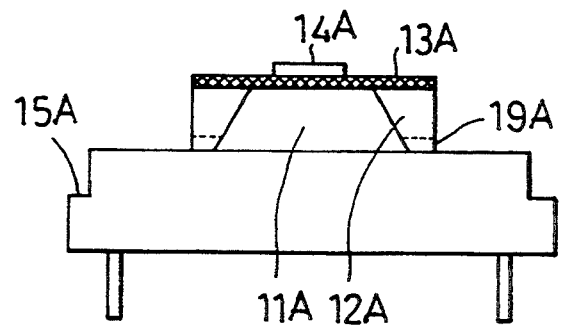
FIGS. 8 to 10 show in schematic side views of other embodiments of the device according to the present invention.
Figure 9:
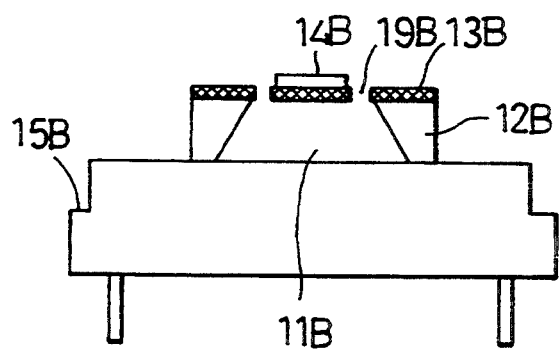

The ventilator 19 as the communicating means; between the cavity 11 and the interior space 17 may be formed also in either one of such manners as shown in FIGS. 8 and 9, in the former of which the ventilator 19A is a groove made in bottom face of the substrate 12A abutting on the base plate 15A, and in the latter of which the ventilator 19B comprises holes made through the heat insulation film 13B. Further, it is another effective measure to provide, between the substrate 12C and the base plate 15C, a spacer 20C having a groove or hole as the ventilator as shown in FIG. 10, in which event the spacer 20C should advantageously be provided on the bottom face of the substrate 12C.

Figure 10:
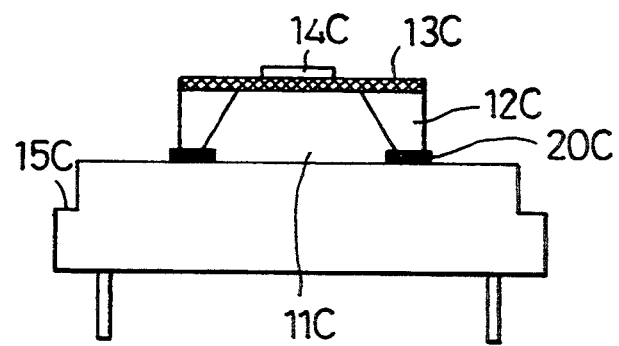

In these embodiments shown in FIGS. 8 to 10, all other constituents which are the same as those in the embodiment of FIGS. 1 to 3 are denoted by the same reference numerals as those given in FIGS. 1 to 3 but with a suffix "A", "B" or "C" added, and they are arranged substantially in the same manner except for the above respects, to achieve the same function.

Figure 11:
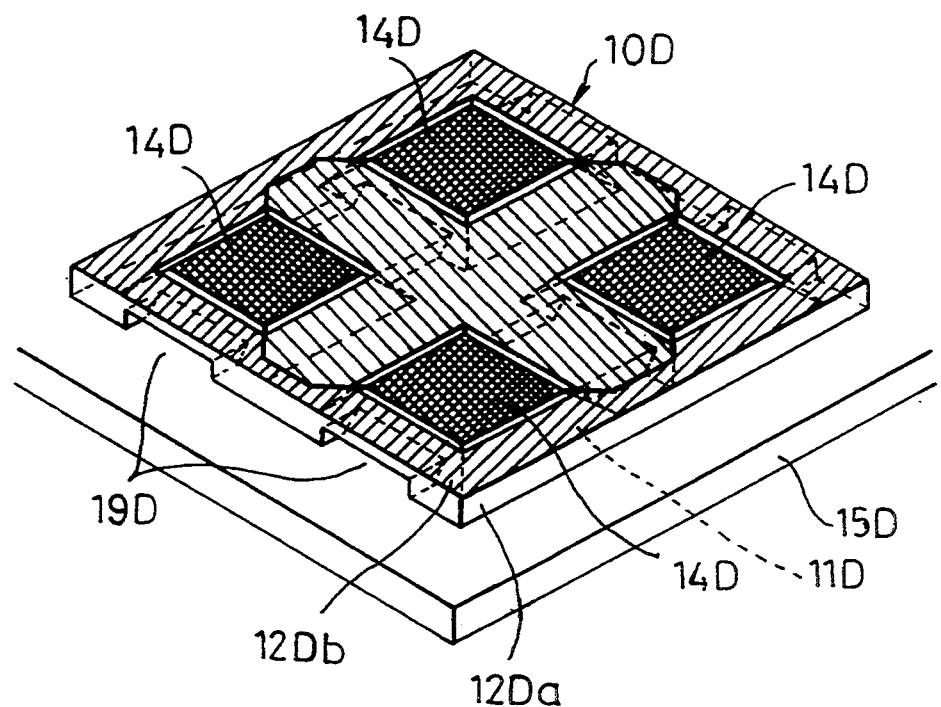
FIGS. 11 and 12 are explanatory views for an aspect of a manner in which the infrared detecting element in the device of FIG. 1 is prepared.
Figure 12:
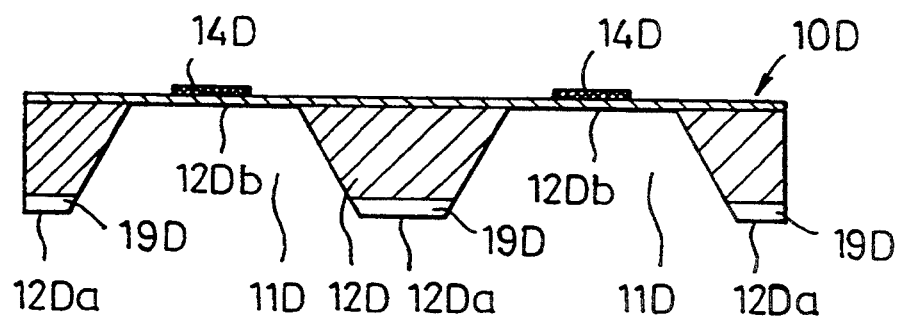

In FIGS. 11 and 12, there is shown one of working aspects for preparing the infrared detecting element, which should preferably be carried out in such steps as described in the followings. That is, an adhesive is applied to a surface of the base plate 15D, the infrared detecting element 10D is mounted onto the surface of the base plate 15D, and they are heat-treated. The infrared detecting element 10D comprises the substrate 12D*a* having the cavity 11D, and the heat insulation film 12D*b* provided to cover the cavity 11D. The heat insulation film 12D*b* is formed with a thermally infrared absorbing in similar manner to the foregoing embodiments. Then, such infrared detector as the thermistor is provided to be above the heat insulation film 12D*b*, for detecting the infrared by utilizing a phenomenon that the resistance value is caused to vary by ambient temperature variation. Preferably, as shown in FIG. 11, the infrared detector 14D is divided into four sections respectively disposed on the thinner parts 12D*b* of the silicon substrate, which are subjected to mutual bridge connection for the infrared detection.

The grooves 19D are formed as the ventilating means in part of the substrate 12D*a* having the cavity 11D. The grooves 19D can be readily provided by means of an anisotropic etching with an aqueous solution of potassium hydroxide, a cutting with a dicing saw or the like, an electro arc machining or the like. It will be advantageous to form the grooves by such means carried out preliminarily with respect to the material substrate or wafer for forming the chips.

Figure 13:
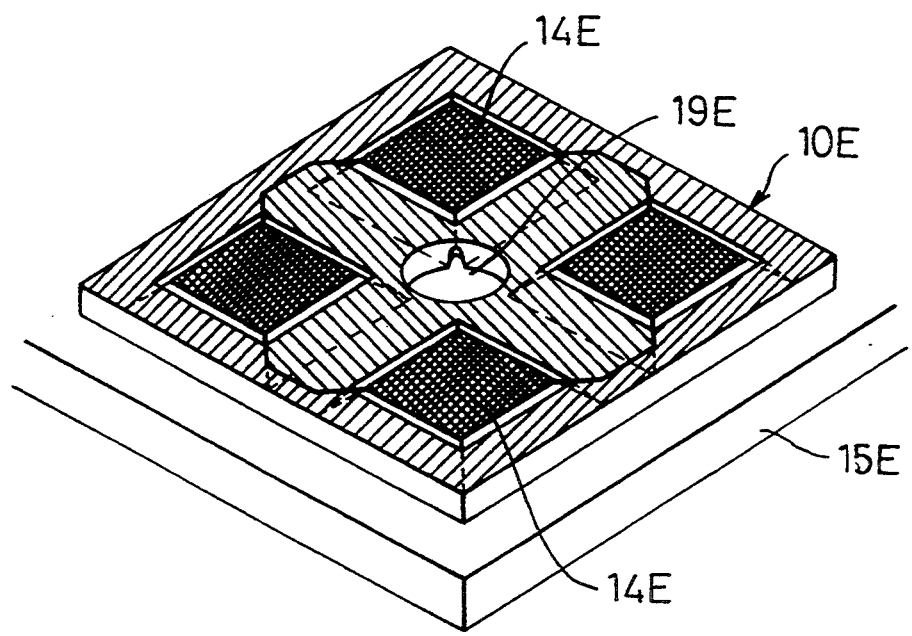
FIGS. 13 and 14 are explanatory views for another aspect of the manner in which the infrared detecting element in the device of FIG. 1 is prepared.
Figure 14:
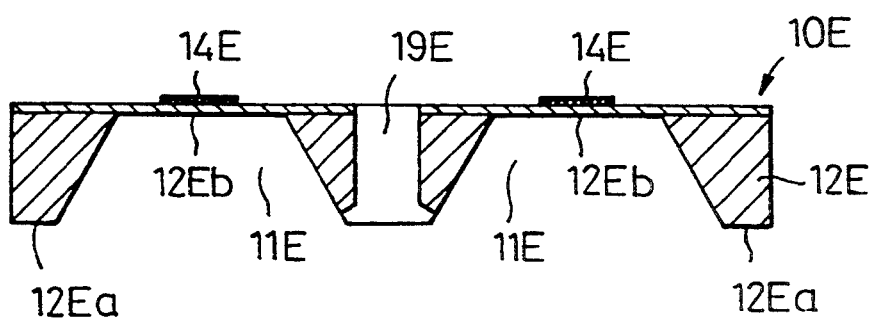
Figure 15:
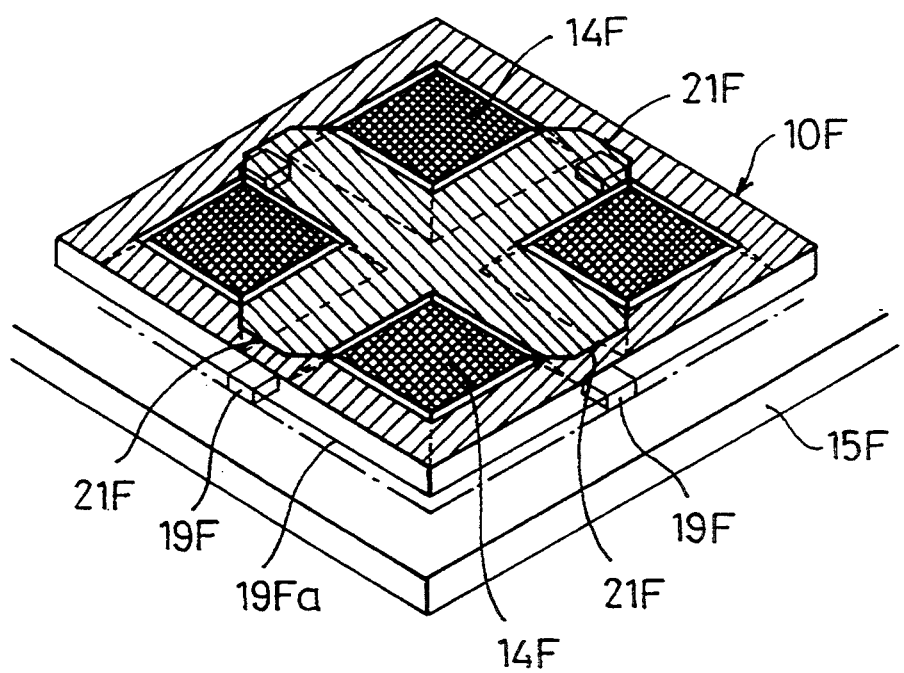
FIGS. 15 and 16 are explanatory views for still another aspect of the manner in which the infrared detecting element in the device of FIG. 1 is prepared.
Figure 16:
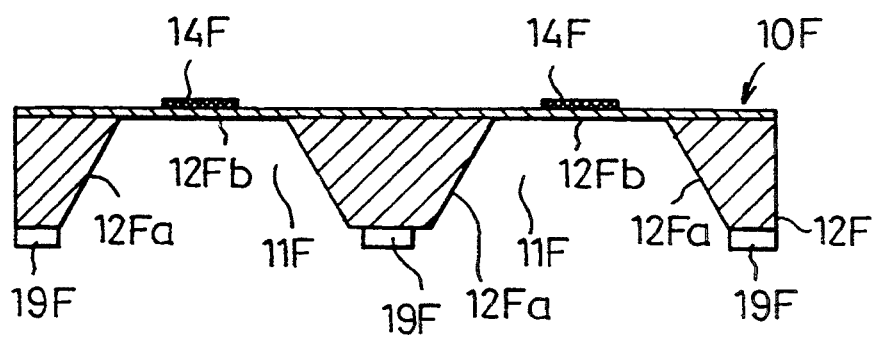

The communicating means can be formed, as shown in FIGS. 13 and 14, in the form of a ventilating hole 19E penetrating through the substrate 12Ea having the cavity 11E and the thermally infrared absorbing film 12Eb, with bottom edge portion of this hole 19E expanded to be contiguous to the cavities 11E disposed below the respective infrared detector sections 14E in the illustrated case. The ventilating hole 19E can be attained by means of the anisotropic etching, cutting, arc machining or the like carried out simultaneously with the formation of the cavity 11E. In another embodiment shown in FIGS. 15 and 16, it is possible to provide a ventilating gap 19F between the base plate 15F and the substrate 12F having the cavity 11F by means of an interposition member 19F disposed between the substrate 12F and the base plate 15F.

In the respective embodiments of FIGS. 11 and 12, FIGS. 13 and 14 and FIGS. 15 and 16, the same constituents as those in the foregoing embodiment of FIGS. 1 to 3 are denoted by the same reference numerals as those used in FIGS. 1 to 3 but with a suffix "D", "E" or "F" added thereto, and are arranged substantially in the same manner as in FIGS. 1 to 3 except for the above respects, to attain the same function.

Figure 17:
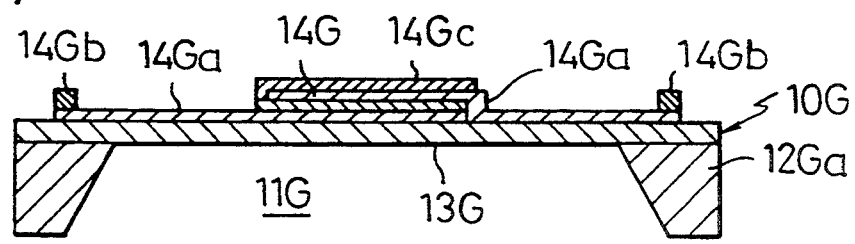
FIG. 17 shows in a sectioned view an embodiment of the infrared detecting element employable in the device shown in FIG. 1.
Figure 18:
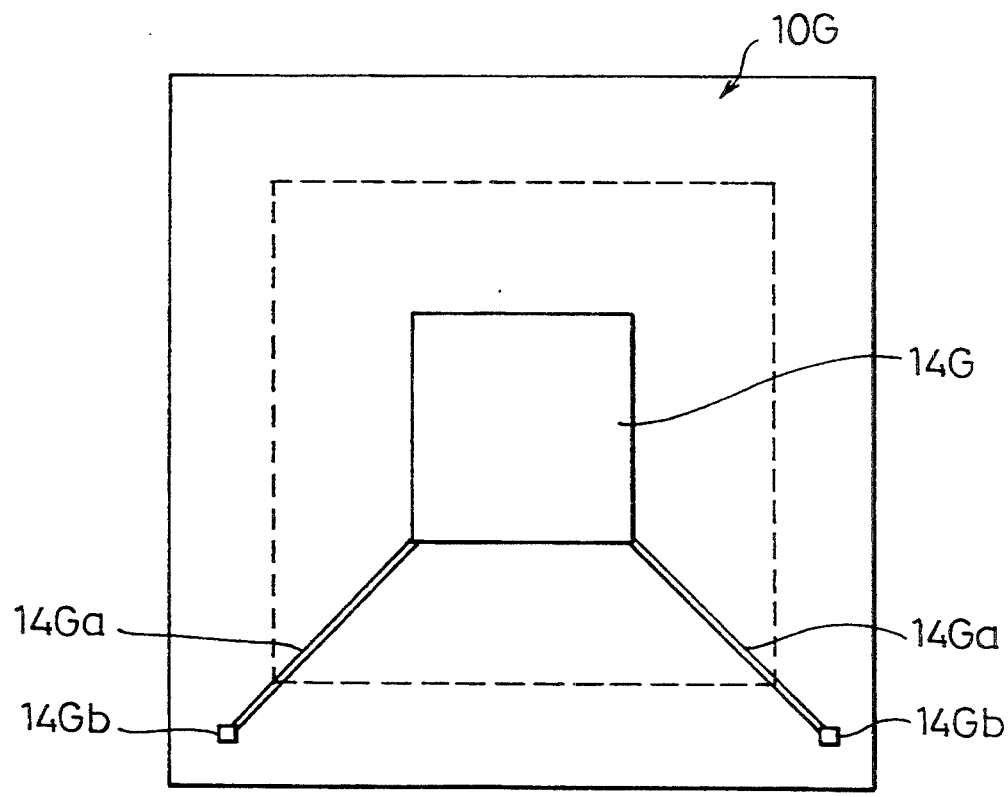
FIG. 18 is a plan view of the infrared detecting element shown in FIG. 17.

Referring to FIGS. 17 and 18, there is shown still another embodiment according to the present invention, in which in particular any distortion or damage of the heat insulation film can be reliably prevented from occurring. In the present instance, the cavity 11G substantially of a square shape is formed in the central part of the substrate 12G, and the heat insulation film 13G covering the cavity 11G is formed with a silicon oxide film or a multi-layered film of silicon oxide film and silicon nitride film, which so functions as not to cause any large internal stress. Preferably the infrared detector 14G is to be formed by a thermistor made of an amorphous silicon. In this case, electrodes 14Ga of chromium Cr or the like are provided to both upper and lower surfaces of the infrared detector 14G, which electrodes are diagonally outward extended and are provided at their extended ends respectively with connecting pads 14Gb. Further, the top of the infrared detector 14G, that is, the upper side electrode 14Ga on the detector 14G is covered with an infrared absorbing film 14Gc. The covering infrared absorbing film 14Gc is formed by silicon oxynitride, which so functions as not to cause any large internal stress and is so high in the infrared absorptivity that the infrared irradiated on the detector 14G can be absorbed at a high efficiency.

With the above arrangement of holding the amorphous silicon thermistor forming the infrared detector 14G between the electrodes 14Ga, the infrared detector 14G is rendered to be easily controllable in the resistance value, any fluctuation between the thermistors can be restrained, and any noise can be reduced.

In preparing the above infrared detecting element 10G, the heat insulation film 13G is initially formed on one surface of the silicon substrate 12G with a silicon oxide film or a multilayered film of silicon oxide film and silicon nitride film, either being 5,000 Å thick, by means of Low Pressure CVD(LP-CVD). In order to reduce the internal stress of this heat insulation film 13G, it is preferable to adopt a multilayered structure of holding the silicon oxide film of 5,000 Å thick between both upper and lower silicon nitride films of 500 Å thick, i.e., a sandwich structure of the films.

Next, a film of chronium Cr of a thickness of 500 Å is formed on the heat insulation film 13G by means of an electron beam evaporation, with the substrate 12G heated to be 200° C., and the electrode 14Ga on the lower side of the infrared detector 14G is formed through a patterning with a photolithography. The electrode 14Ga is shaped in its central part to be square of 1.9×1.9 mm and provided with one of the thin outward extensions. For chromium employed, it is possible to employ nickel chromium in place of chromium.

Then, a p-type a-SiC film of a thickness 1 μm is formed on the lower side electrode through the glow exhaust decomposition, and the infrared detector 14G consisting of the thermistor is formed into a square of 2×2 mm through the patterning of photolithography made with respect to the a-SiC film formed. The film forming conditions in this case are the use of hydrogen diluted monosilane with 400 mol % methane and 0.25 mol % diborane added, the substrate 12G heated to be 180° C., gas pressure of 0.9 Torr, frequency of 13.56 MHz and exhausting power of 20 W. On this infrared detector formed, a film of chromium is formed to be 500 Å thick by means of the electron beam evaporation with the substrate 12G heated to be 200° C., and the film is made into the upper side electrode 14Ga through the patterning into a predetermined shape by means of the photolithography. While the shape of the upper side electrode is made the same as the lower side electrode, the thin outward extension of this upper side electrode is made to be in different direction from the foregoing extension of the lower side electrode.

Further, a silicon oxynitride layer of 1 μm is formed on the upper side electrode by means of the glow exhaust decomposition, the layer is patterned into a square shape of 2×2 mm through the photolithography, and the infrared absorbing film 14Gc is thereby formed, upon which the film forming conditions are the use of mixture gas of monosilane and dinitrogen monoxide, with a ratio of monosilane and dinitrogen monoxide made to be 2:35, substrate temperature of 200° C., gas pressure of 1 Torr, frequency of 13.56 MHz and exhaust power of 30 W. Aluminium film is formed on the extended ends of the outward extensions of the electrodes 14Ga by means of the electron beam evaporation, the film is then patterned and the pads 14Gb are provided on the extended ends.

After the formation of the heat insulation film 13G, infrared detector 14G and electrodes 14Ga on the substrate 12G, the cavity 11G is formed in the substrate 12G on the side opposite to that having the infrared detector 14G, by means of the anisotropic etching carried out with potassium hydroxide. In respect of the infrared detecting element 10G thus prepared, there has occurred no distortion nor breakage in the thermally infrared absorbing film, and a high detecting sensitivity has been shown. Further, the layer of silicon oxynitride obtained as in the above description has shown a nitrogen molar fraction of 40% with the residual stress made substantially zero, and also has shown such an excellent infrared absorptivity coefficient as being 80% with respect to the infrared of the wavelength nearby 8 to 12 μm.

Figure 19:
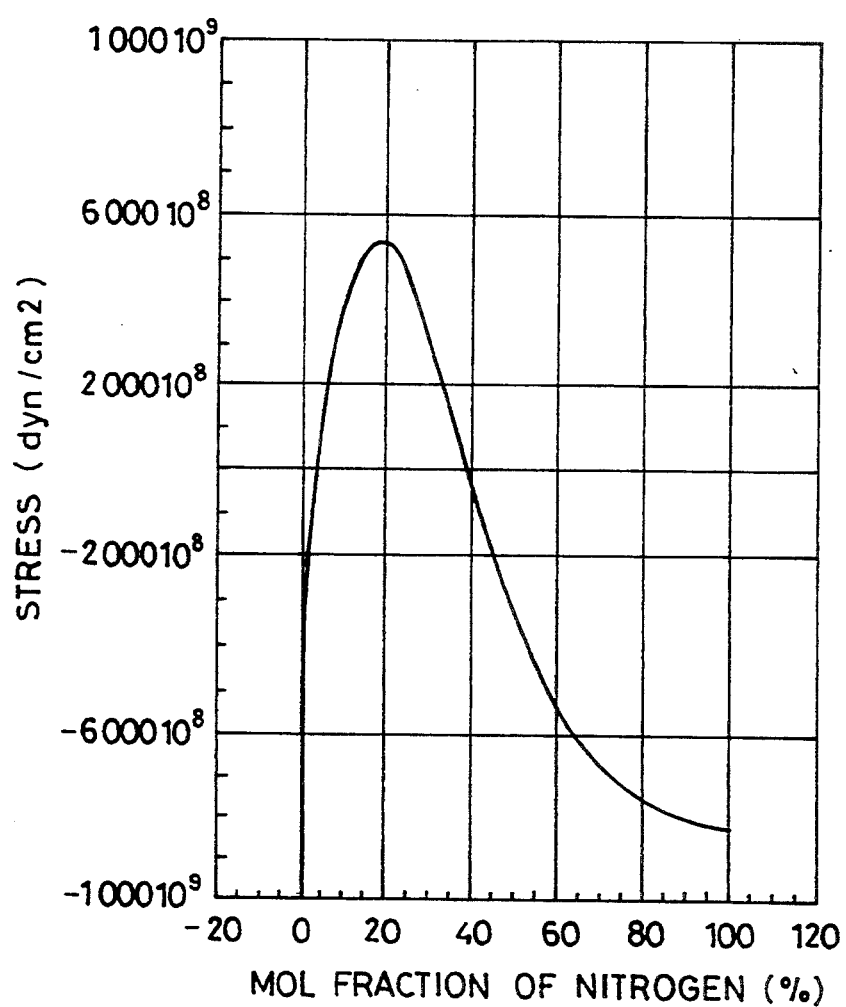
FIG. 19 is a diagram showing the relationship between the mol fraction of nitrogen and the residual stress in respect of silicon oxynitride for forming the infrared absorbing film in the infrared detecting element of FIG. 18.
Figure 20:
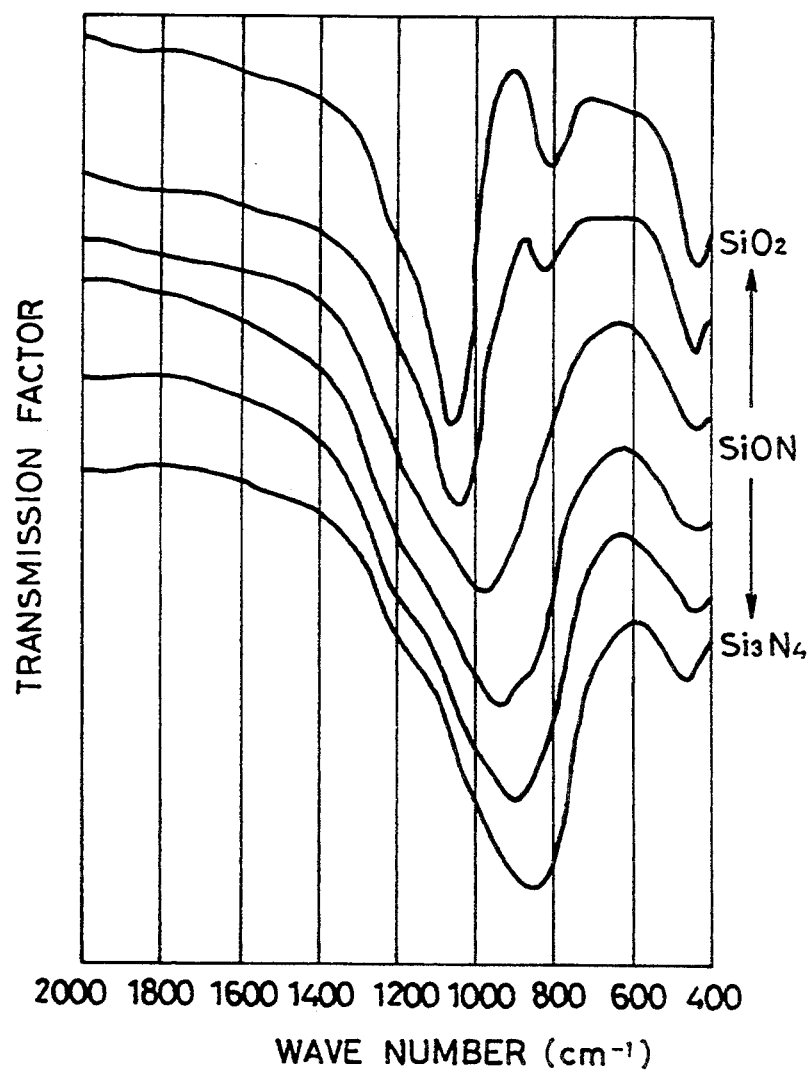
FIG. 20 is a diagram showing the infrared transmittance of the infrared absorbing film in different compositions, relative to the infrared detecting element of FIG. 18.

Further, as shown in FIG. 19, the residual stress of various silicon oxynitride films different in the nitrogen molar fraction has been measured. The infrared absorptivity coefficient also of various silicon oxynitride films made different in the nitrogen content ratio, such as from SiO through SiON to $Si_3N_4$ has been measured, as shown in FIG. 20. It will be appreciated here that, as will be clear from the graphical exhibition of FIGS. 19 and 20, the silicon oxynitride film having a nitrogen ratio set to be within a range showing the optimum values of the residual stress and infrared absorptivity coefficient as the infrared absorbing film should optimumly be used.

Figure 21:
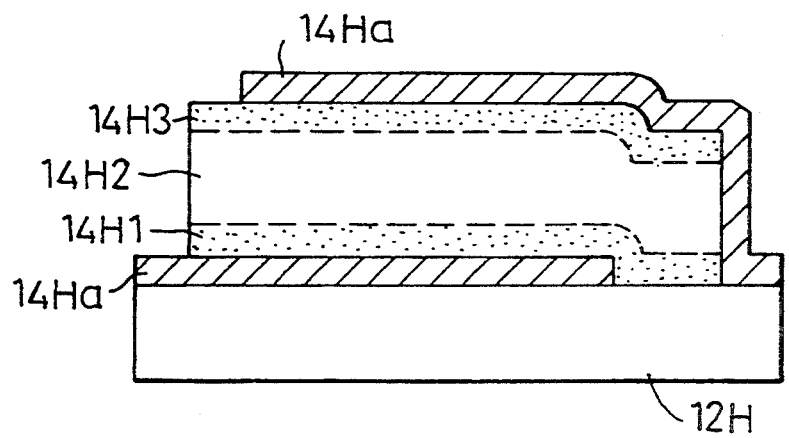
FIGS. 21 to 26 shown in sectioned views respective further embodiments of the infrared detecting element according to the present invention.

Referring now to FIG. 21, there is shown the infrared detecting element 10H in another embodiment according to the present invention, in which the lower side electrode 14Ha of chromium Cr or the like is formed on the substrate 12H, the p-type amorphous silicon layer (single element semiconductor thin film) 14H1 is formed on this electrode 14Ha, p-type amorphous silicon carbide layer (amorphous alloy semiconductor thin film) 14H2 is formed on the layer 14H1, and further p-type amorphous silicon layer (the single element semiconductor film) 14H3 is formed on the layer 14H2, so that the infrared detector 14H is formed with these layers 14H1, 14H2 and 14H3. The upper side electrode 14Ha of chromium Cr or the like is further provided on the top of the detector 14H.

Referring more specifically to an example in which the detecting element 10H of the present embodiment, the chromium electrode 14Ha is first formed to be about 2,000 Å on the substrate 12H of such insulating material as a glass by means of the electron beam evaporation. Next, the p-type amorphous silicon layer 14H1 of about 300 Å is formed by adding boron by $B_2H_6/SiH_4$:0.25% onto the lower side chromium electrode 14Ha, then the amorphous silicon carbide layer 14H2 of about 5,000 Å and forming the amorphous alloy semiconductor thin film is laminated on the layer 14H1. In forming this amorphous silicon carbide layer 14H2, an a-SiC layer is formed by means of a capacitive coupling type plasma CVD method, under such conditions that $SiH_4$ is made 100 sccm, $B_2H_6$ (0.5% $H_2$ as the base) is 50 sccm, $CH_4$ is 400 sccm, gas pressure is 0.9 Torr, exhaust power is 20 W, electrode separation is 25 mm, electrode size is 30×30 mm, and RF frequency is 13.56 MHz. Thereafter, the p-type amorphous silicon layer 14H3 of $B_2H_6/SiH_4$:0.25% is formed to be about 300 Å on the layer 14H2, and finally the upper side chromium electrode 14Ha is formed to be about 2,000 Å by means of the electron beam evaporation.

Figure 38:
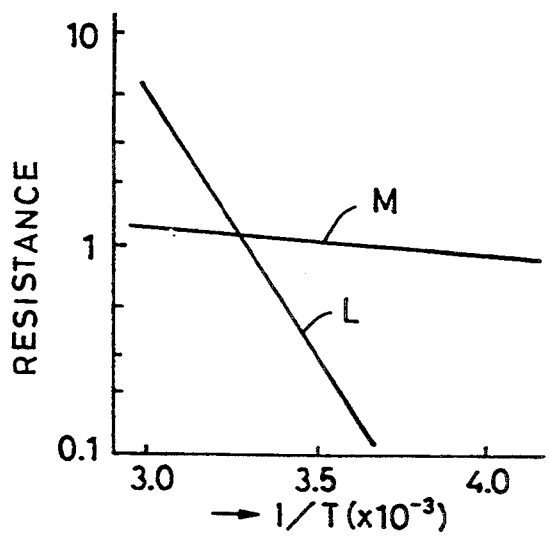
FIG. 38 is a temperature characteristic diagram of the semiconductor thin film thermistor employed in the element according to the present invention, shown in contrast to that of known thermistor.

The infrared detector 14H of the semiconductor films according to the present embodiment shows such temperature characteristics as presented by a straight line L in FIG. 38 and showing a high B constant of about 5,000, and the detector is of extremely excellent temperature characteristics as compared with conventional infrared detector the temperature characteristics of which are as shown by the other straight line M in FIG. 38.

Figure 22:
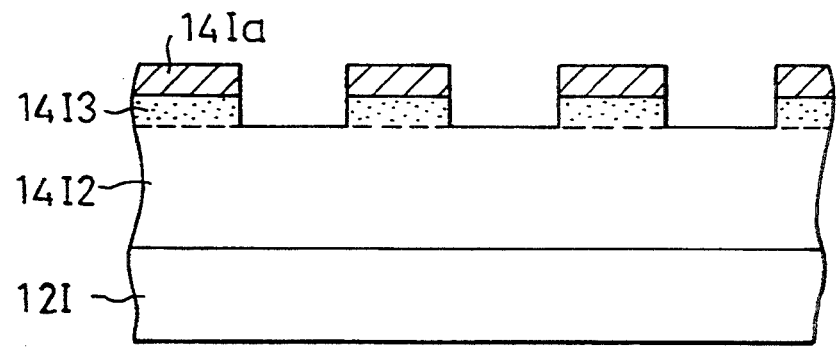
Figure 23:
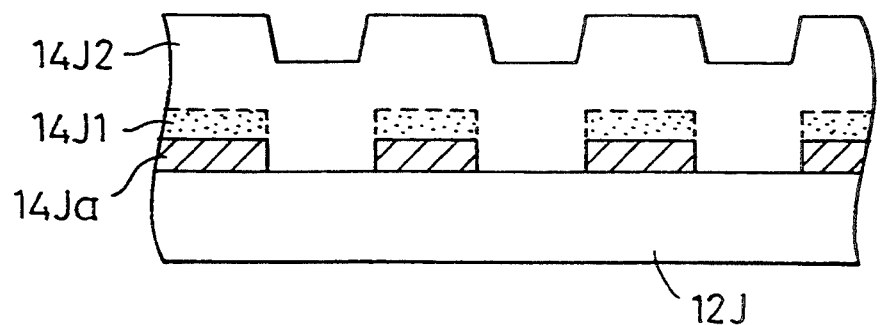

In other embodiments of the present invention as shown in FIGS. 22 and 23, a comb-teeth arrangement of the electrodes is adopted. In FIG. 22, the upper side electrode 14Ia is provided in the comb-teeth shape, while in FIG. 23 the lower side electrode 14Ja is formed in the comb-teeth shape. With this arrangement of the electrodes, too, the same characteristics as the straight line L shown in FIG. 38 can be attained. In this case, the boron concentration is made to be $B_2H_6/SiH_4$:0.25% (constant).

Figure 24:
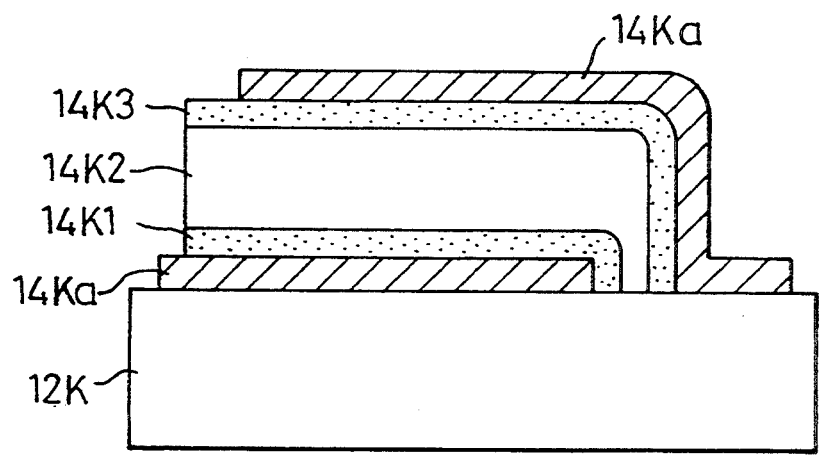

In another embodiment shown in FIG. 24, the detector is provided with ohmic characteristics. More specifically, a chromium electrode 14Ka is first formed on the insulating substrate 12K of a glass or the like by means of the electron beam evaporation, to be about 2,000 Å thick. Then, the n-type amorphous silicon thin film 14K1 is formed as the single element semiconductor thin film is formed on the electrode 14Ka, upon which an n-type a-Si film with phosphorus P added by $PH_3/SiH_4$:about 2% by means of the plasma CVD is laminated to an extent of causing no leak occurred by the chromium electrode 14Ka (normally more than 100 Å). On this n-type amorphous silicon thin film 14K1, the opposite conduction p-type amorphous silicon carbide layer 14K2 is formed. In realizing a resistance value of about 1MΩ, a film of $CH_4/SiH_4$:400% (carbon concentration [C/Si=0.295 reference for FIG. 28]) and $B_2H_6/SiH_4$:0.25% is laminated to be about 1 μm.

On this p-type amorphous silicon carbide thin film 14K2, the opposite conduction n-type amorphous silicon layer 14K3 and the further chromium electrode 14Ka are formed in the same manner as in the foregoing embodiments. With the thus formed infrared detector 14K, in contrast to an ordinary structure in which a barrier is likely to be caused to occur due to a difference in the work function between both thin films at their junction surface, any influence of such barrier can be effectively reduced by the formation of both thin films in the mutually opposite conduction type for causing a recombination current to flow between these films.

Figure 34:
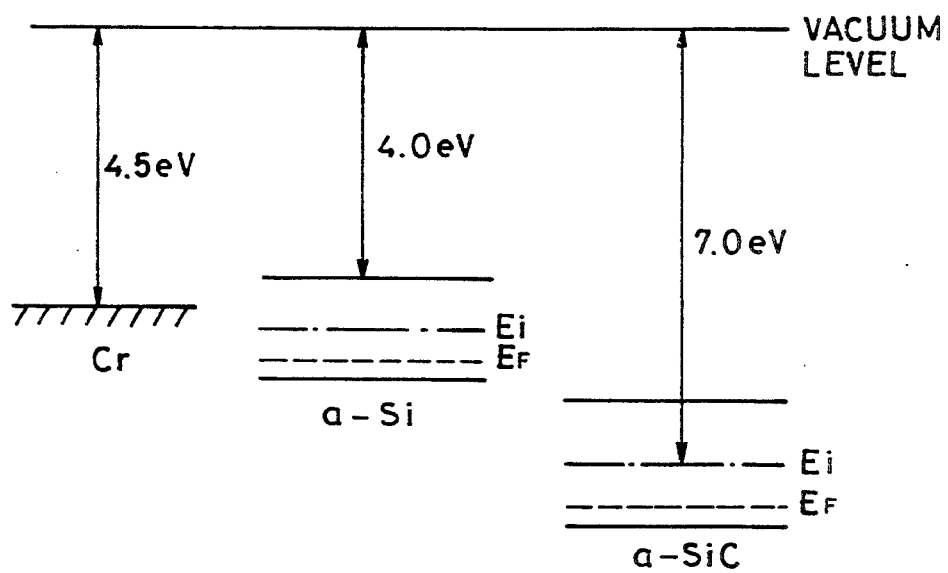
FIG. 34 is a general band diagram of a Cr film employable as a metallic electrode in the infrared detecting element of the present invention, in contrast to amorphous silicon (a-Si) film and amorphous silicon carbide (a-SiC) film.

Referring here also to FIG. 34 showing the band diagram of the chromium electrode employed in comparison with the a-Si and a-SiC, it is assumed that both of a-Si and a-SiC employed here are doped to be p-type, and voltage level with respect to vacuum level is obtained for a-SiC with values analogyzed from an aspect of Crystal. From the drawing, it has been found that the p-type a-Si and p-type SiC involve an energy difference from the vacuum level to the valence band to be more than 2 eV.

Figure 35:
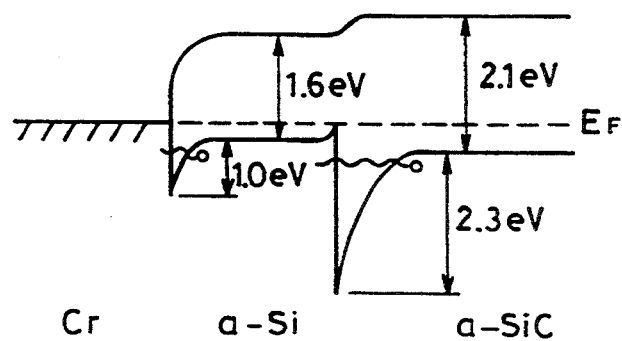
FIG. 35 is a band diagram of a metallic electrode employable in the element according to the present invention, in which Cr film, a-Si film and a-SiC film are connected to each other.
Figure 36:
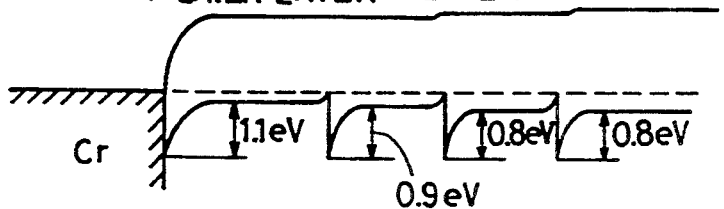
FIG. 36 is a band diagram of a semiconductor thin film thermistor having buffer layers, employable in the infrared detecting element of the present invention.

Referring also to FIG. 35, there is shown a band structure in which the chromium electrode, p-type a-Si film and p-type a-SiC film are connected, and in which an electric barrier of about 2.3 eV is occurring between the p-type a-Si film and the p-type SiC film. At this barrier, carriers are likely to be depleted due to the energy difference with respect to the vacuum level, and this portion functions as a capacitor, rather than as a resistor.

Figure 39:
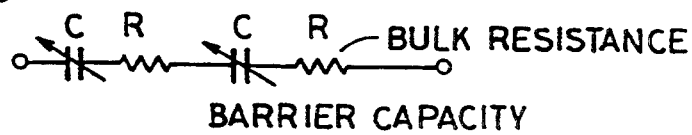
FIG. 39 is an equivalent circuit to the electrode of FIG. 35.
Figure 40:
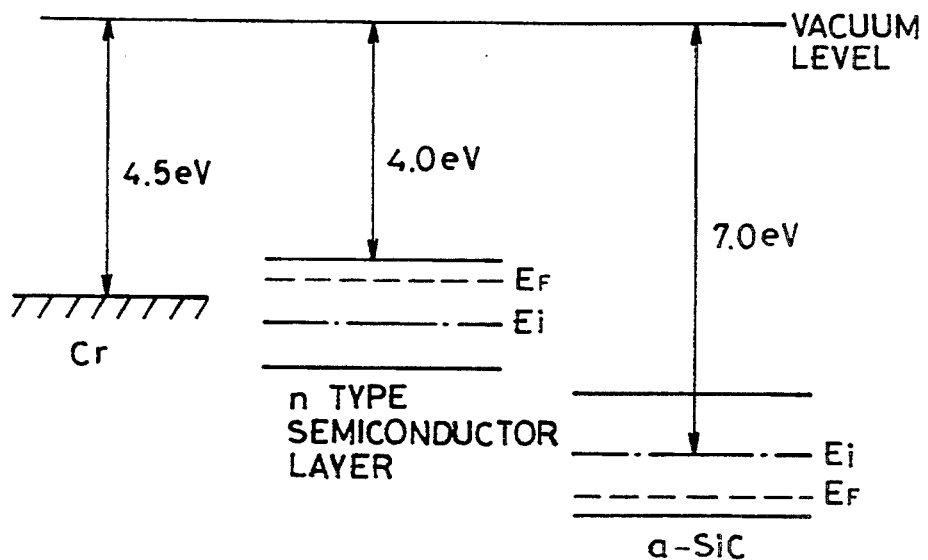
FIG. 40 is a band diagram of the Cr electrode, n-type amorphous silicon thin film (of single element semiconductor) and p-type amorphous silicon carbide thin film (of amorphous alloy semiconductor) respectively from vacuum level.
Figure 41:
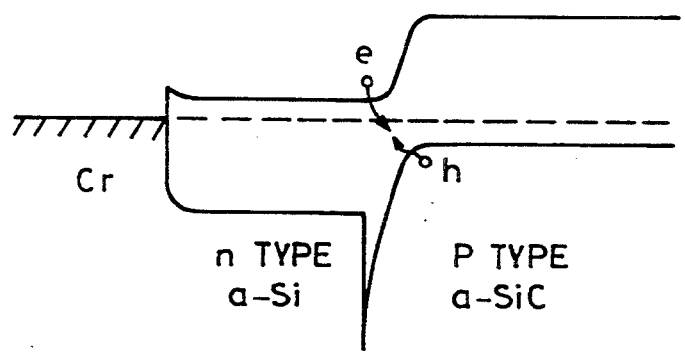
FIG. 41 is a band diagram in the case where the Cr electrode, n-type amorphous silicon thin film and p-type amorphous silicon carbide thin film are brought into mutual contact, as employed in the infrared detecting element according to the present invention.

In FIG. 39, there is shown a circuit equivalent to the arrangement of FIG. 24, and there is formed a state in which variable capacitors C are connected in series with resistors R of the infrared detector. In FIG. 40, there are shown respective band diagrams of chromium, a-Si and a-SiC with respect to the vacuum level, whereas FIG. 41 shows their band diagram in the state where the three materials are brought into contact with each other. In this case, the carriers contributive to the transmission of n-type amorphous silicon are electrons, while the carriers contributive to the transmission of p-type amorphous silicon carbide are holes. Accordingly, as shown in FIG. 41, the electrons and holes are recombined between the n-type amorphous silicon layer and the p-type amorphous silicon carbide layer, and the recombination current is caused to flow. This recombination current is not affected by any barrier occurring between the n-type amorphous silicon layer and the p-type amorphous silicon carbide layer, as will be clear from FIG. 41, and an excellent ohmic electrode can be provided.

In short, the embodiment of FIG. 24 is to insert between the amorphous alloy semiconductor and both side electrodes each of the single element semiconductors of mutually opposite conduction type, and it is made possible to reduce any barrier with respect to Schottky barrier occurring between the amorphous alloy semiconductor thin film and metallic resistor, and any influence of the barrier occurring at the thin film resistor can be reduced by the recombination current between the amorphous alloy semiconductor thin film and the single element semiconductor thin film.

Figure 42:
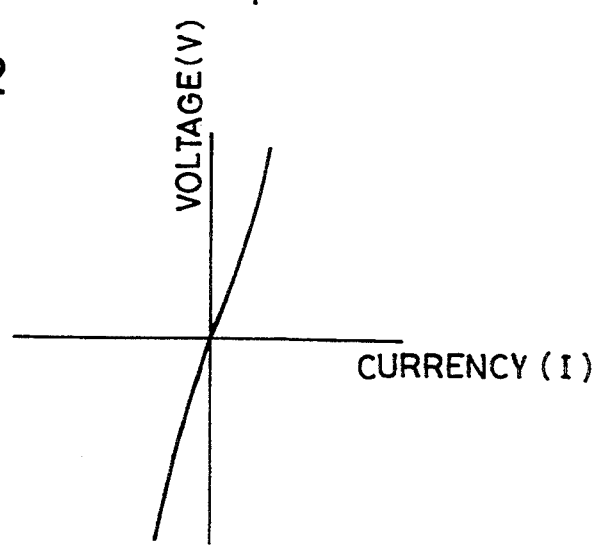
FIG. 42 is a current-to-voltage (I-V) characteristic diagram of the element in the embodiment of FIG. 24.
Figure 43:
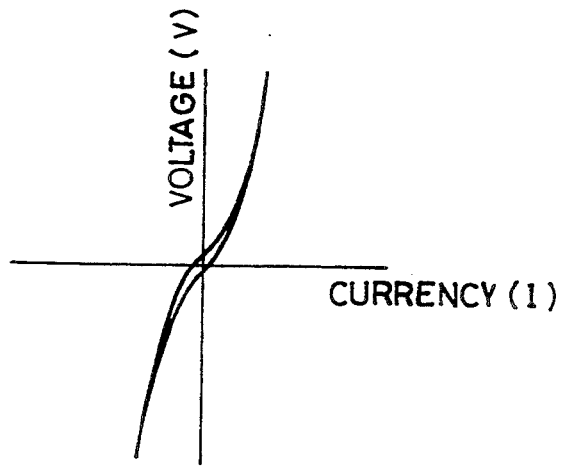
FIG. 43 is an I-V characteristic diagram of the element in an event where the alloy semiconductor thin film and single element semiconductor thin film are made to be the same conductivity type.
Figure 44:
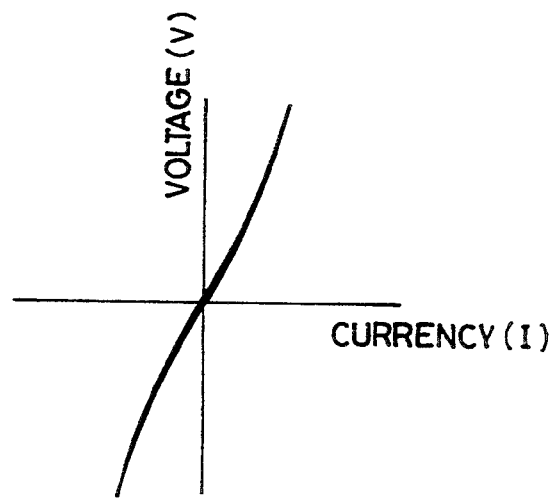
FIG. 44 is an I-V characteristic diagram of the element in the embodiment of FIG. 25.
Figure 45:
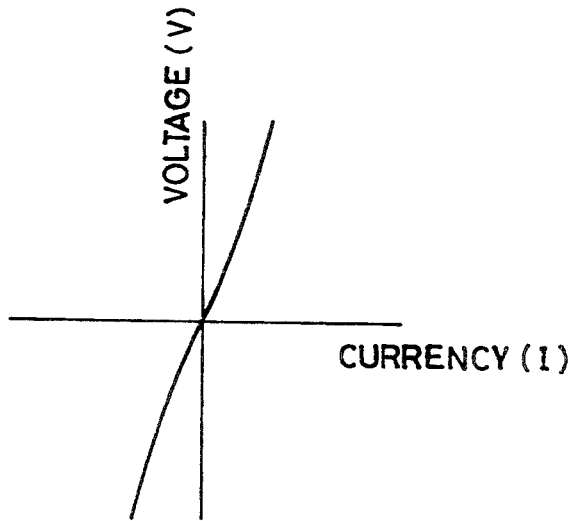
FIG. 45 is an I-V characteristic diagram of the element in another aspect of the embodiment shown in FIG. 25.

In FIG. 42, there is shown an I-V characteristic curve in an event where the p-type amorphous silicon carbide thin film and, as the single element semiconductor thin film of opposite conduction type, n-type amorphous silicon thin film of $PH_3/SiH_4:1\%$ are employed. FIG. 43 further shows an I-V characteristic curve in the case where the amorphous silicon carbide thin film and single element semiconductor thin film are of the same conduction type. As shown further in FIGS. 44 and 45 in addition to FIGS. 42 and 43, the arrangement of the embodiment shown in FIG. 24 effectively restrains the problems in respect of the distortion in I-V characteristic and capacitance, in contrast to the case where both thin films are of the same conduction type.

Figure 25:
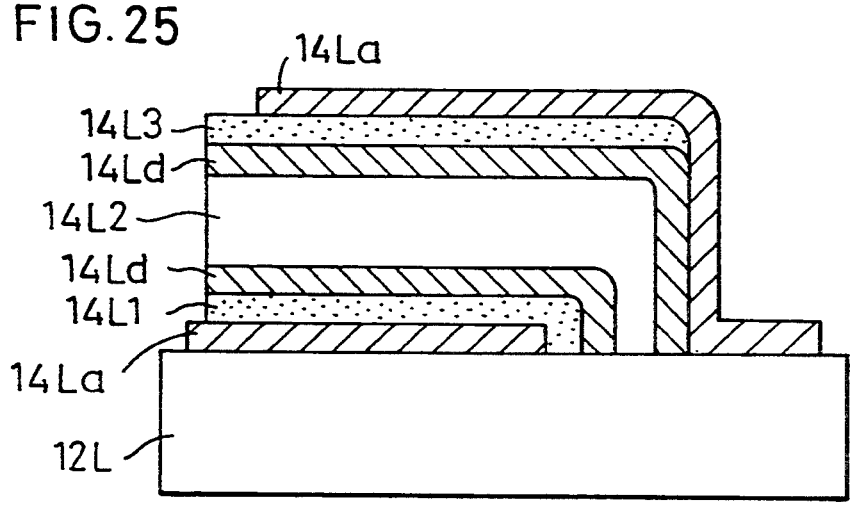
Figure 26:
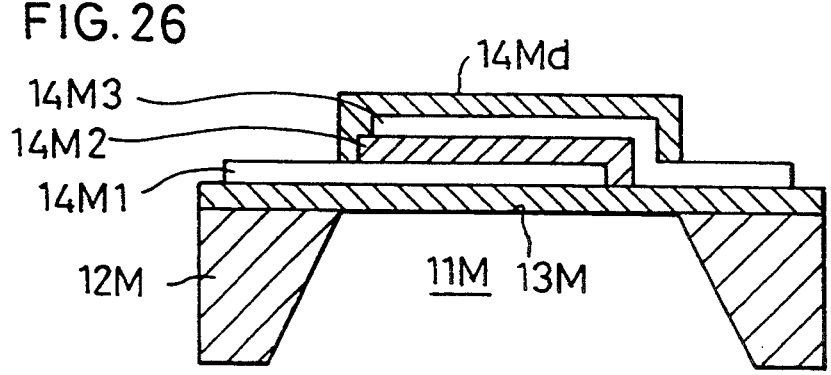
Figure 27:
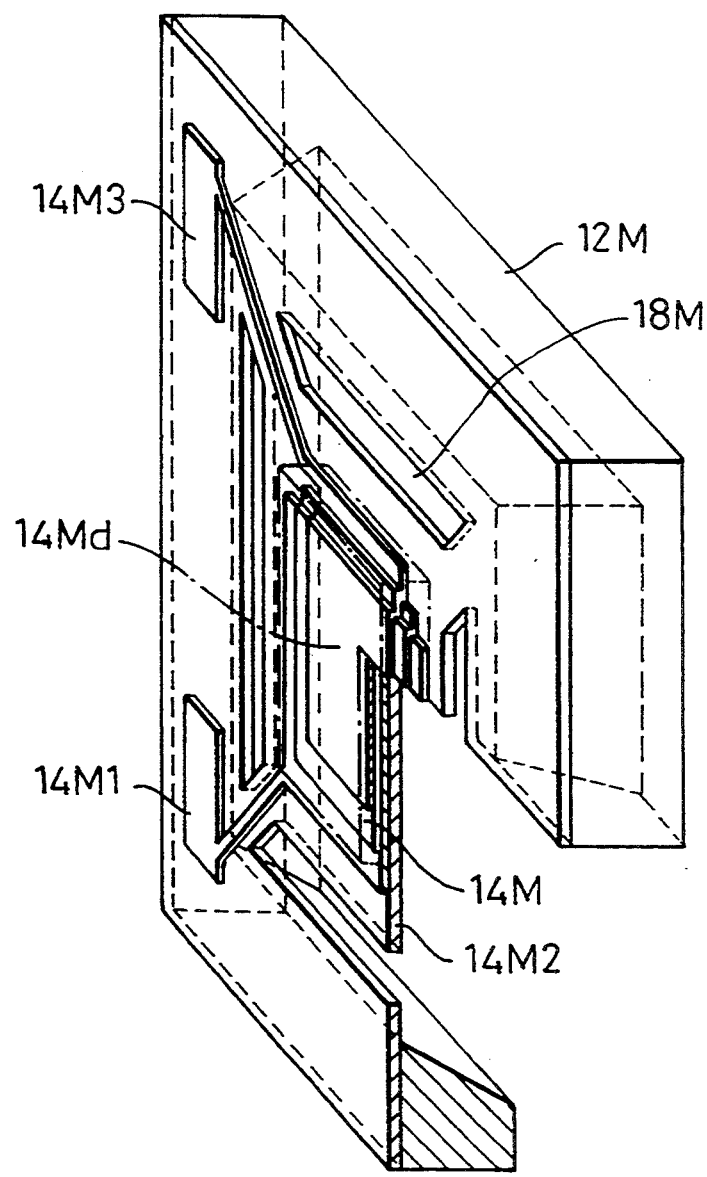
FIG. 27 is a perspective view showing with part omitted the infrared detecting element in the embodiment of FIG. 26.

In another embodiment shown in FIG. 25 according to the present invention, buffer layers 14L$d$ are respectively disposed between the amorphous silicon carbide thin film 14L2 and both side single-element semiconductor thin films 14L1 and 14L3. In this case, the buffer layers 14L$d$ can be formed in the same manner as the single-element semiconductor thin films 14L1 and 14L3. Other constituents and functions are the same as those in the embodiment of FIG. 24 (see also FIG. 37).

In the respective embodiments shown in FIGS. 21 to 27, the same constituents as those in the embodiment of FIGS. 1 to 3 are denoted by the same reference numerals as those used in FIGS. 1 to 3 but with a suffix "H", "I", "J", "K", "L" or "M" added, and other constituents than those described in the above are substantially the same as those in the embodiment of FIGS. 1 to 3, with the same functions made thereby attainable.

Figure 28:
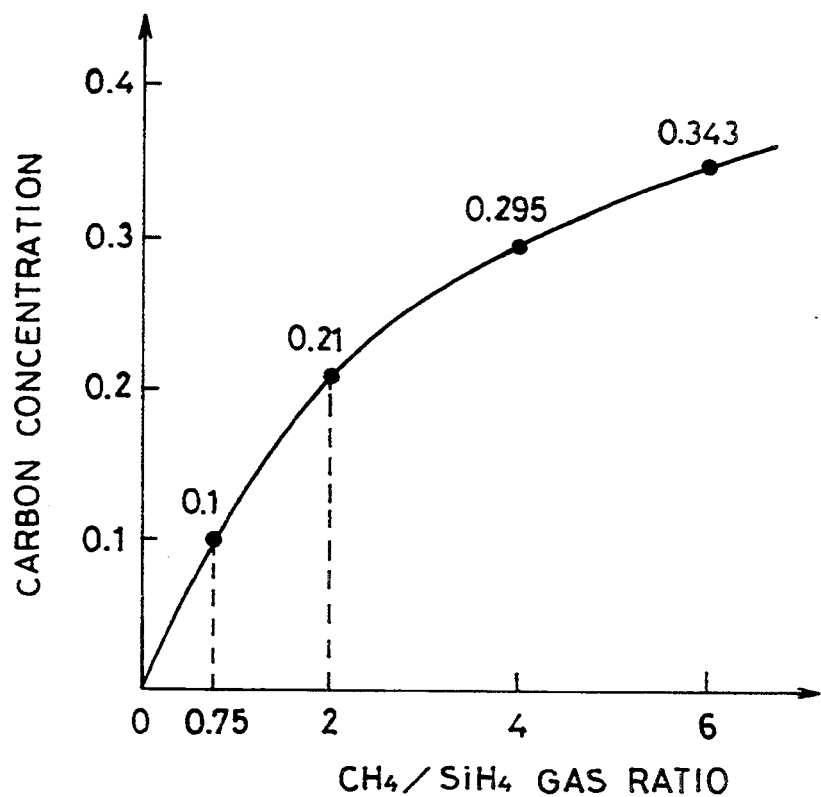
FIG. 28 is a diagram showing graphically the relationship between the gas composition ratio and the carbon concentration in silicon carbide employed in preparing the infrared detecting element of FIG. 26.
Figure 29:
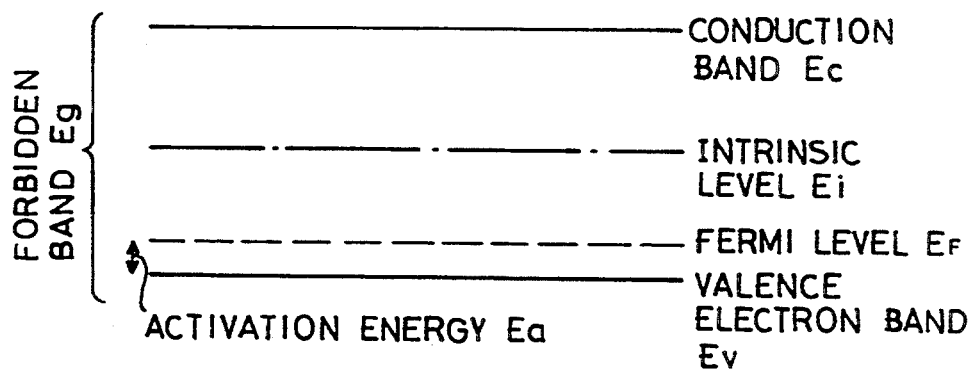
FIG. 29 is a band diagram of a semiconductor with a single element and doped with boron to be p-type, the semiconductor being employed in forming the infrared detecting element of FIG. 26.
Figure 30:
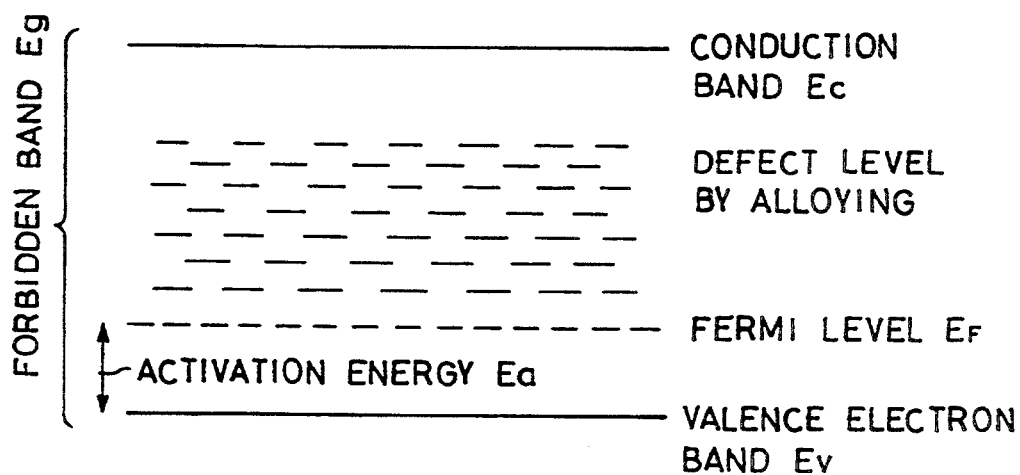
FIG. 30 is a band diagram of an alloy semiconductor subjected to a relatively high concentration doping and employed in forming the element of FIG. 26.
Figure 31:
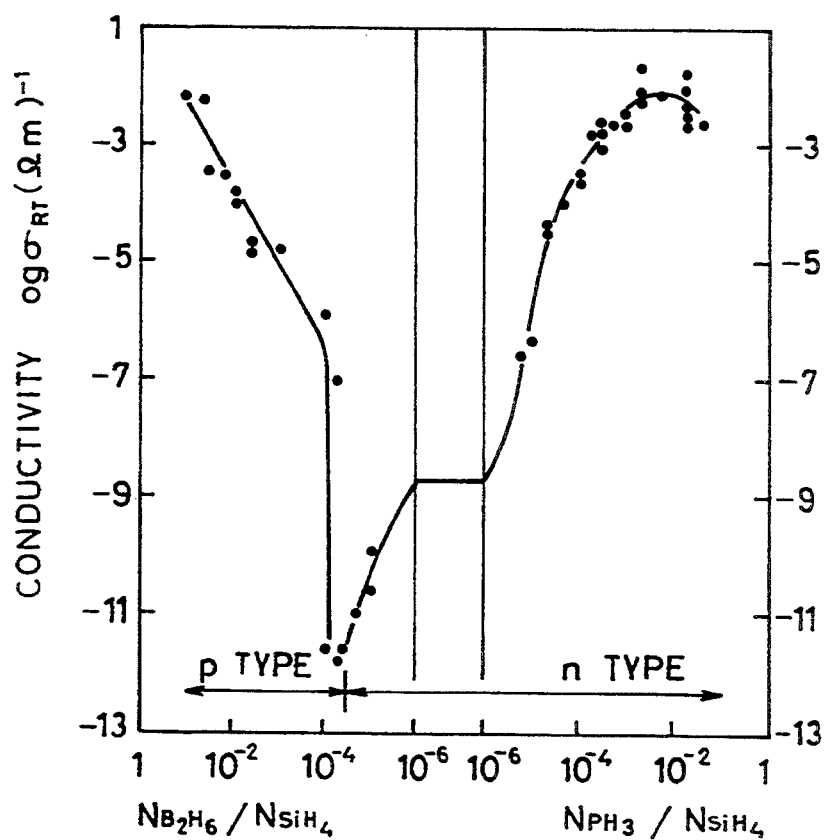
FIG. 31 is a diagram showing general doping characteristics of amorphous silicon, in electric conductivity characteristic curves of the film with respect to the doping level.
Figure 32:
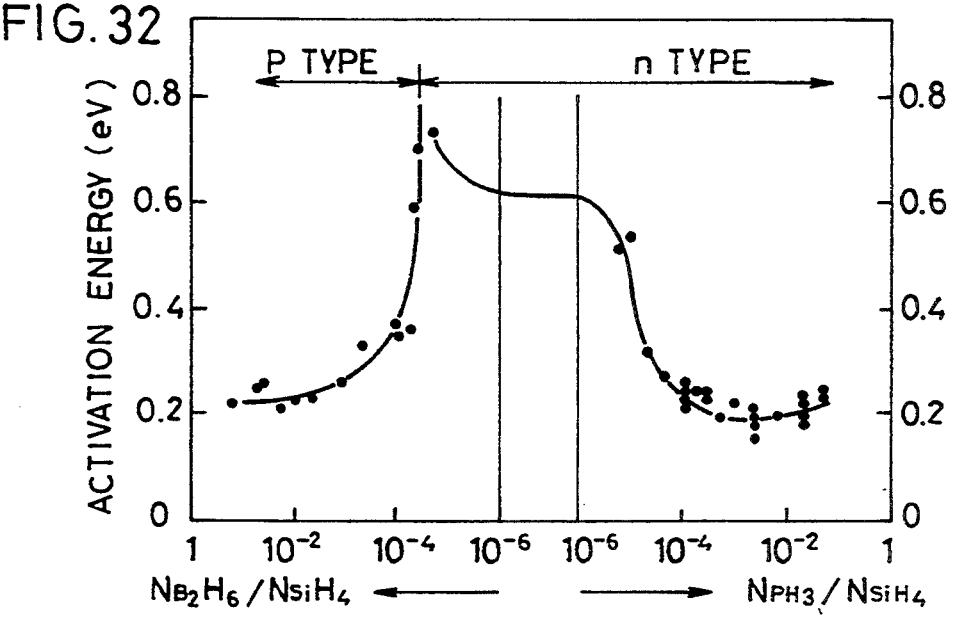
FIG. 32 is a diagram showing general doping characteristics of amorphous silicon, in activated energy characteristic curves of the film with respect to the doping level.
Figure 33:
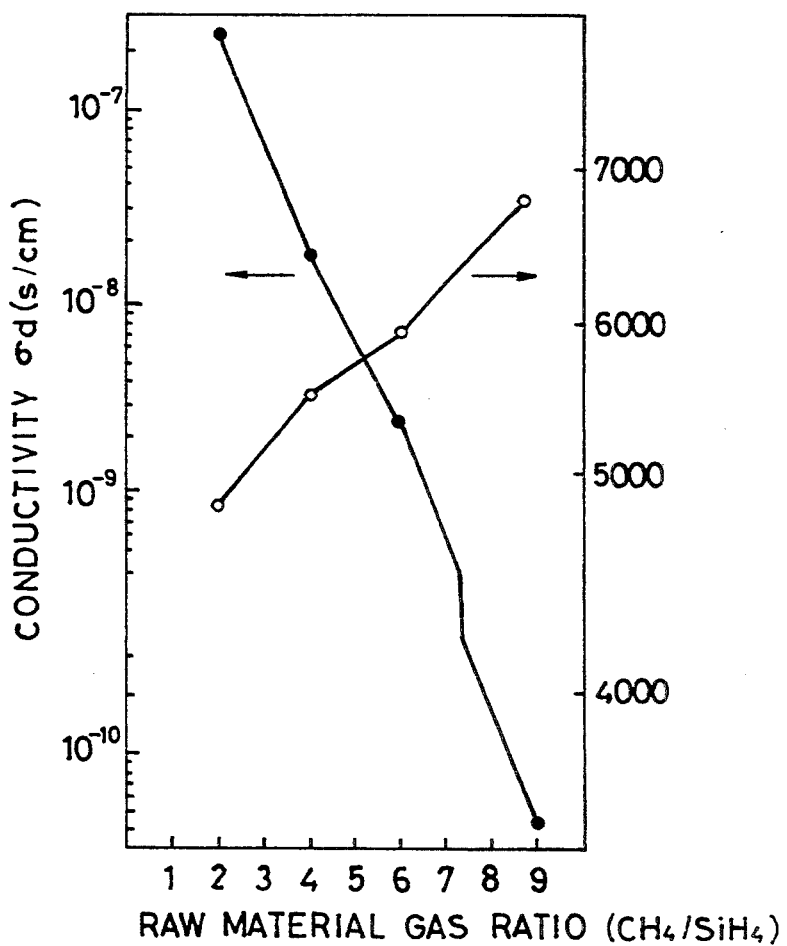
FIG. 33 is a characteristic diagram of a thermistor of an alloy semiconductor film employable in the infrared detecting element according to the present invention, showing variation in the film resistance and thermistor constant in an event where $CH_4$ concentration is varied in manufacturing the thermistor.
Figure 37:
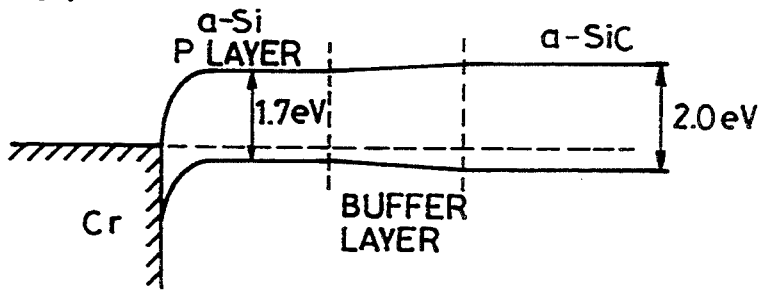
FIG. 37 is a band diagram of another semiconductor thin film thermistor having a buffer layer, employable in the element according to the present invention.

FIGS. 28 to 45 are diagrams added for ready understanding of the respective embodiments of FIGS. 21 to 27, and contents of these diagrams should be self-explanatory from their terminological indications given therein. In this case, FIG. 28 shows in particular the relationship between $CH_4/SiH_4$ ratio (flow rate ratio being less than 6) and the carbon concentration in the process of forming the amorphous alloy semiconductor thin film, as a result of measurements obtained through an Auger analysis. Further, FIG. 37 is a band diagram in the case where a buffer layer is employed for the purpose of sequentially varying the composition ratio from the amorphous silicon carbide thin film to the amorphous silicon thin film, wherein, as will be clear from the drawing, no barrier is involved between these thin films and this arrangement is capable of remarkably improving the thermistor characteristics.

Figure 46:
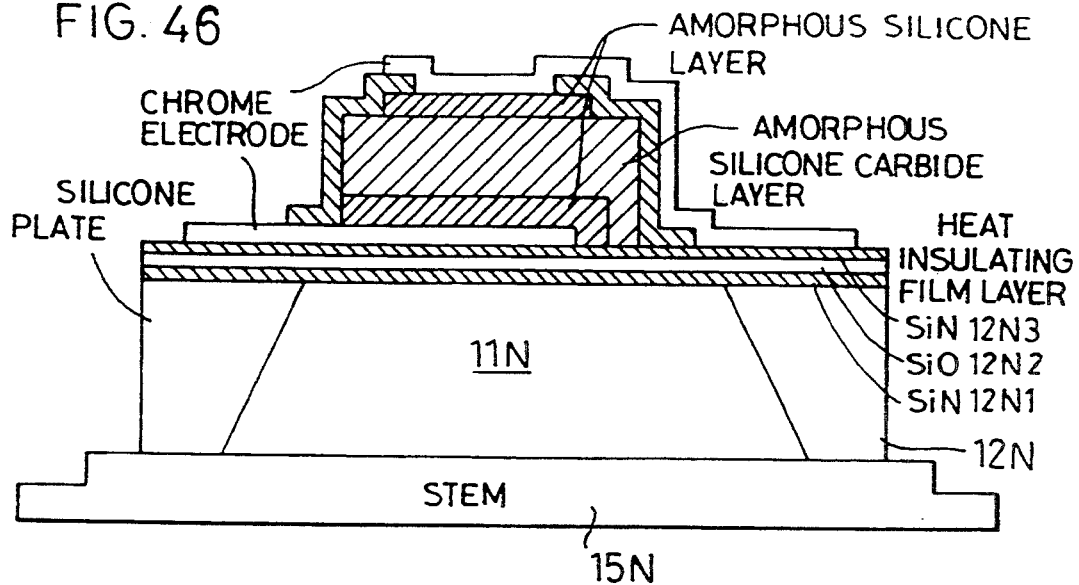
FIG. 46 shows in a sectioned view the infrared detecting element in another embodiment employable in the device of FIG. 1.

In another embodiment shown in FIG. 46, the thermally infrared absorbing part is formed by a sequential lamination of silicon nitride film 12N$a$, silicon oxide film 12N$b$ and silicon nitride film 12N$c$ and interposed between the substrate 12N and the infrared detector 14N. With this lamination of the films 12N$a$ to 12N$c$ interposed, any heat generated in the infrared detecting device can be effectively kept.

Figure 47:
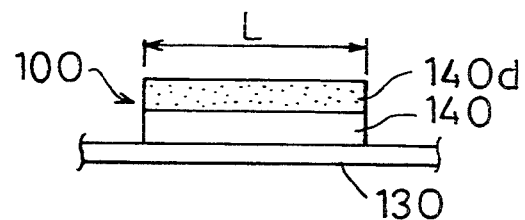
FIGS. 47 to 49 are explanatory views for other embodiments of the infrared detecting element employable in the device of FIG. 1.
Figure 48:
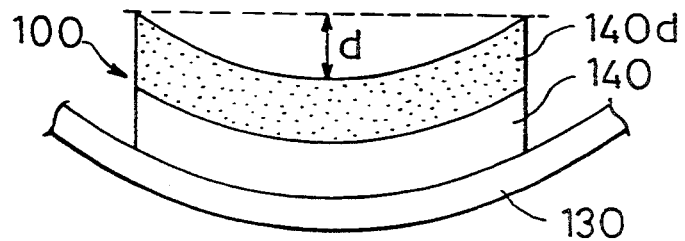
Figure 49:
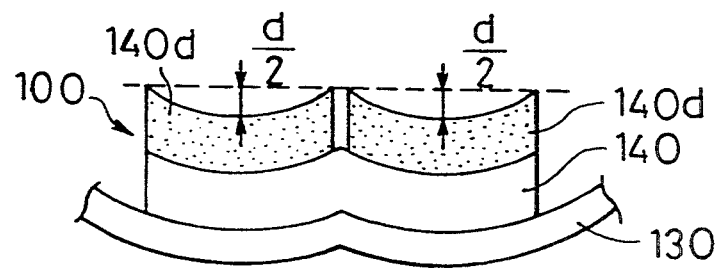
Figure 50:
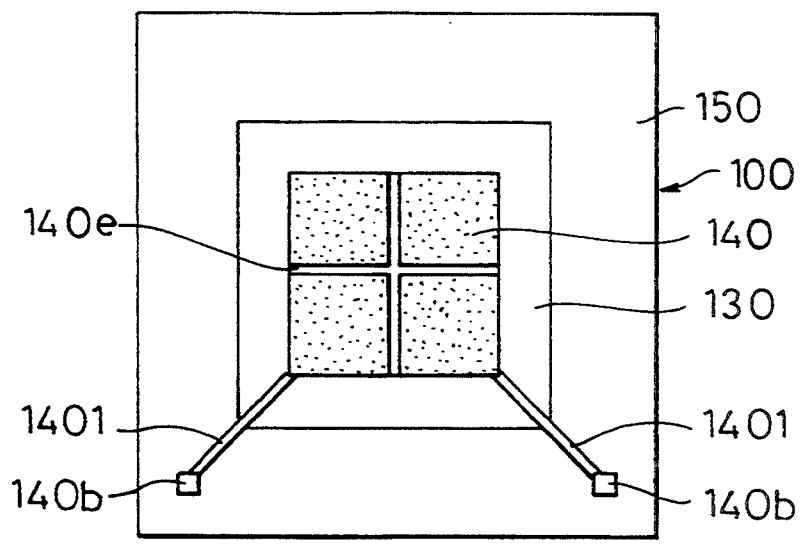
FIG. 50 shows in a plan view still another embodiment of the infrared detecting element employable in the device of FIG. 1.
Figure 51:
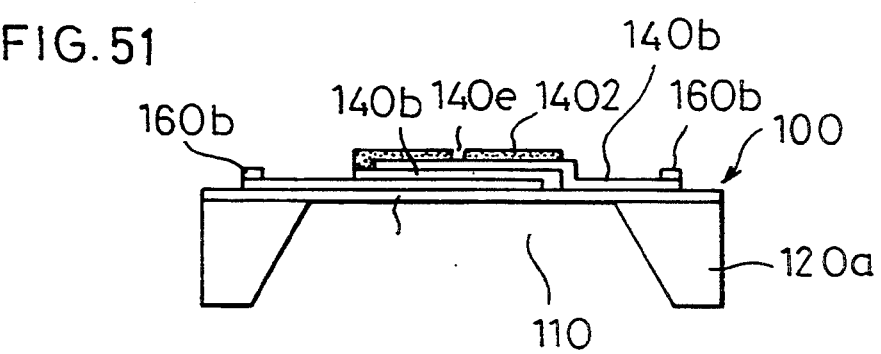
FIG. 51 is a sectioned view of the element of FIG. 50.
Figure 52:
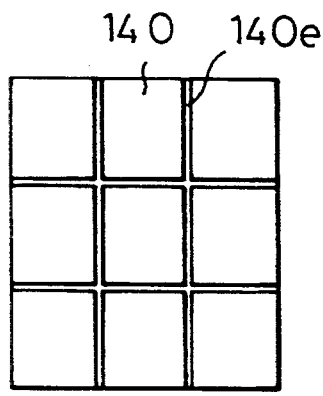
FIGS. 52 to 54 show in plan views further embodiments of the infrared detecting element employable in the device of FIG. 1.
Figure 53:
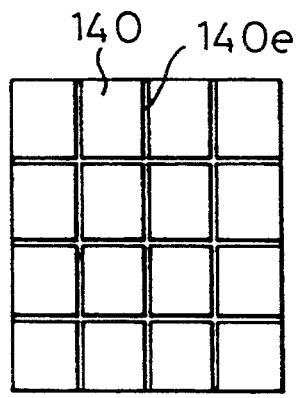
Figure 54:
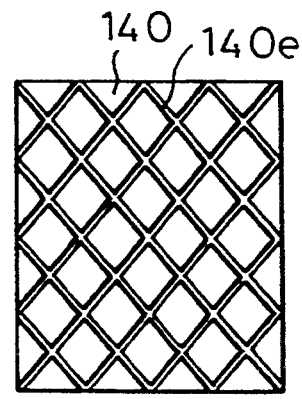

FIG. 47 shows a basic structure of another embodiment according to the present invention, in which there is involved a risk that any internal stress applied to the infrared detecting element 100 may cause a warpage of depth "d" as shown in FIG. 48 to arise, whereas a division of the element 100 into two parts, for example, as shown in FIG. 49 is effective to limit the warpage of the element to be a depth d/2, and the warping can be, reduced to be half. In practice, as shown in FIGS. 50 and 51, the infrared absorbing film 14O is provided as divided into four parts here, by means of partition slits 14O$e$. It is of course possible to divide the infrared absorbing film into more parts, for example, into nine parts as shown in FIG. 52 or into sixteen parts as shown in FIG. 53, or to provide the partition slits 14O$e$ diagonally so as to divide the film into rhombic parts as shown in FIG. 54.

Figure 55:
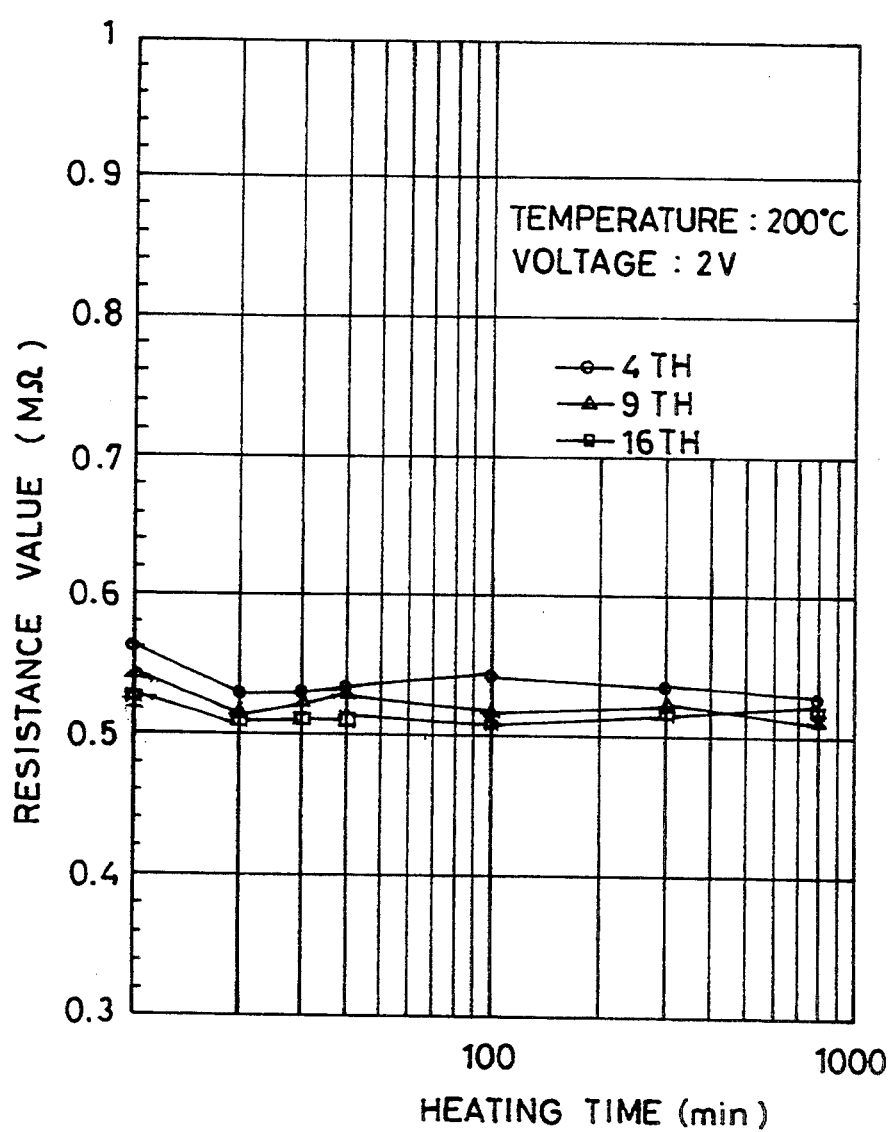
FIG. 55 is a diagram showing the relationship between the heating time and the thermistor resistance value in the embodiments of FIGS. 52 to 54.
Figure 56:
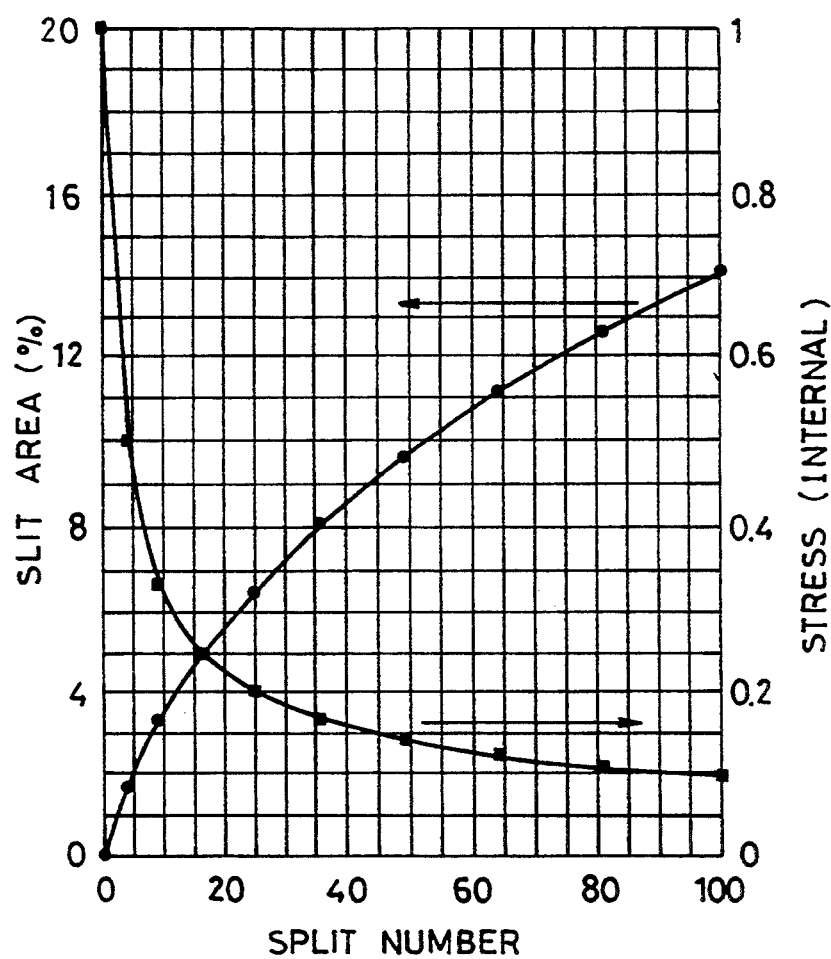
FIG. 56 is a diagram showing the relationship between the split number of infrared absorbing film and the internal stress and between the split number and the slit area in the respective embodiments of the infrared detecting element shown in FIGS. 52 to 54.

In FIG. 55, there is shown the relationship between the heating time and the resistance value of the thermistor in the events where the infrared absorbing film is divided into four parts, nine parts and sixteen parts. In FIG. 56, there is shown the relationship between the number of division and the area of partition slits and between the number of division and internal stress.

Figure 57:
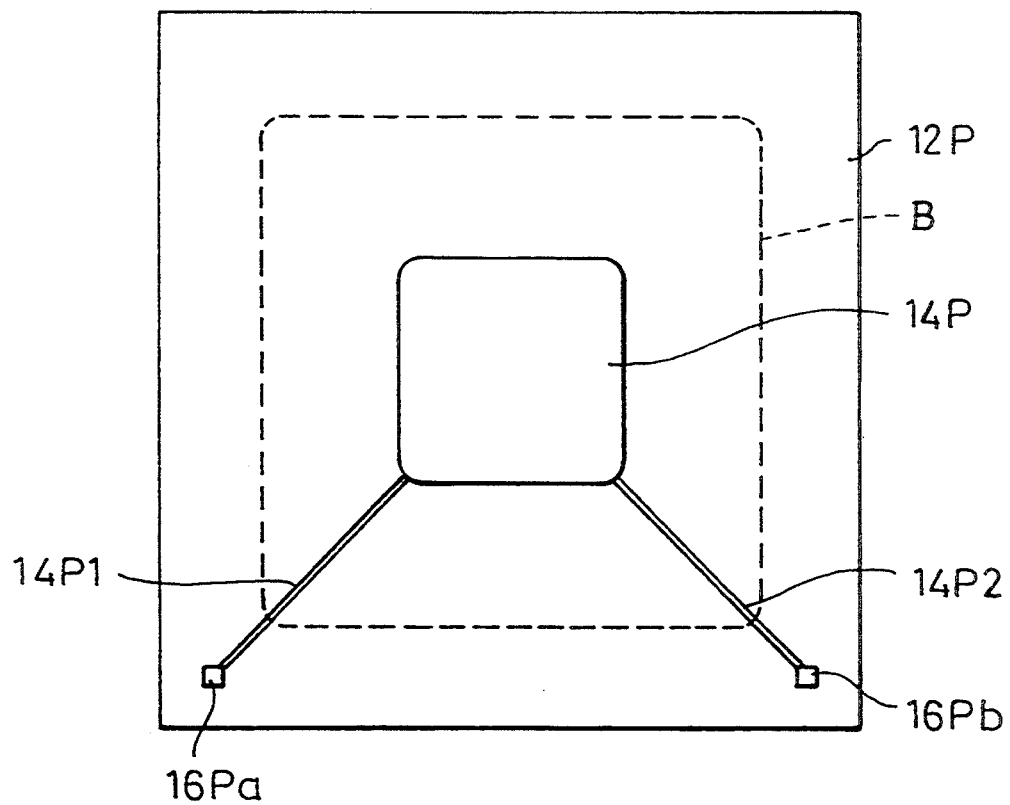
FIG. 57 shows in a plan view another embodiment of the infrared detecting element employable in the device of FIG. 1.
Figure 58:
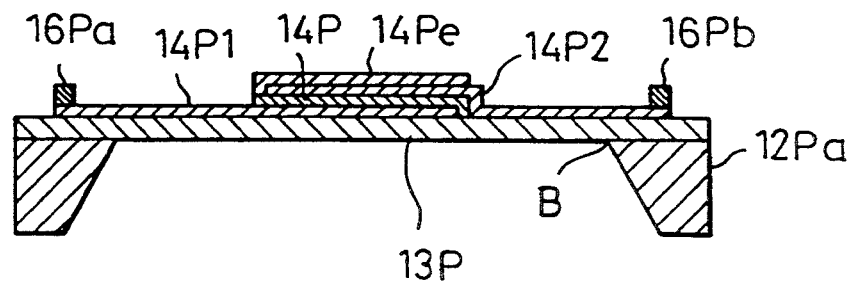
FIG. 58 is a sectioned view of the element of FIG. 57.
Figure 59:
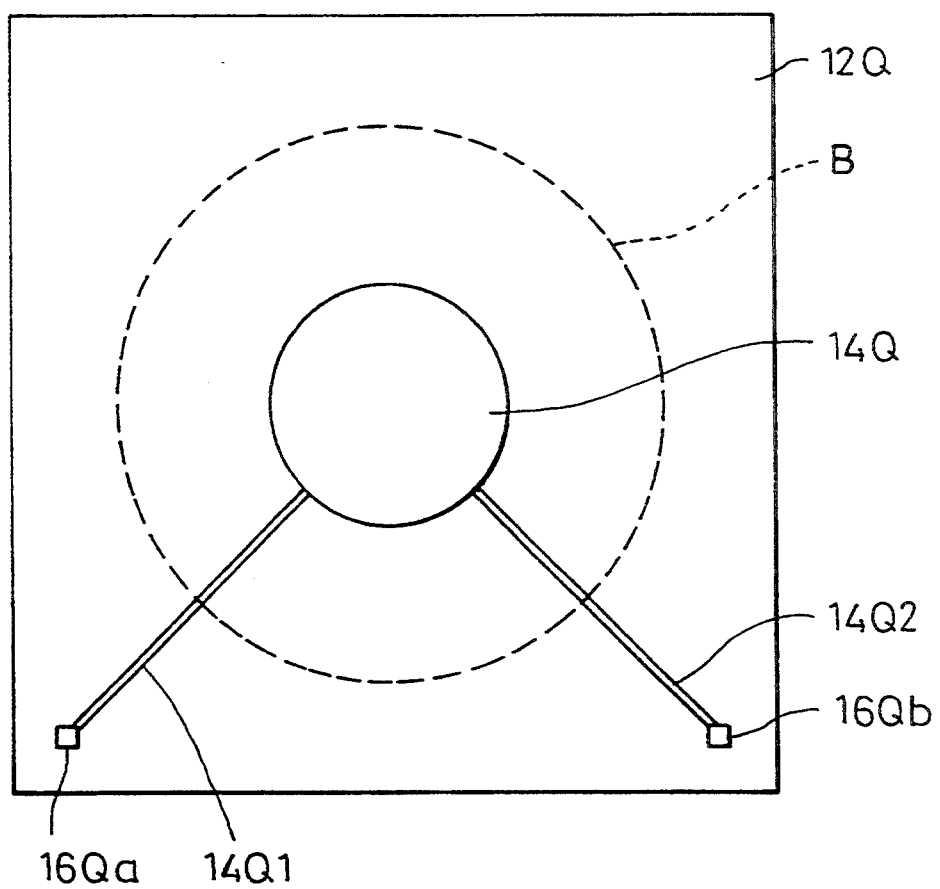
FIG. 59 shows in a plan view another embodiment of the infrared detecting element employable in the device of FIG. 1.

In another embodiment according to the present invention as shown in FIGS. 57 and 58, the infrared detector 14P is formed as rounded at respective corners, whereby the heat insulation film can be prevented from the distortion and damage which have been likely to occur at corner portions. In this connection, it is also possible to provide, as shown in FIG. 59, the infrared detector 14Q to have a circular periphery. In these cases of FIGS. 57 and 58 and of FIG. 59, the cavity in the substrate 12P or 12Q should preferably be made to have rounded corners or to be circular as shown by broken line B in the drawings.

Figure 60:
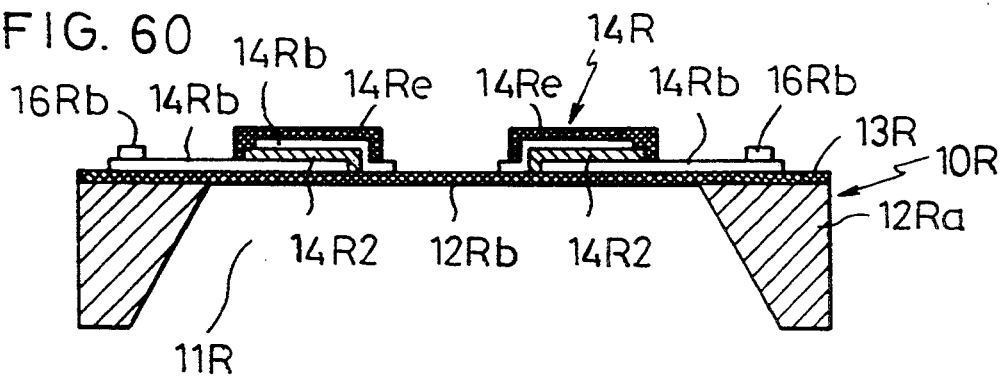
FIG. 60 shows in a sectioned view another embodiment of the infrared detecting element employable in the device of FIG. 1.
Figure 61:
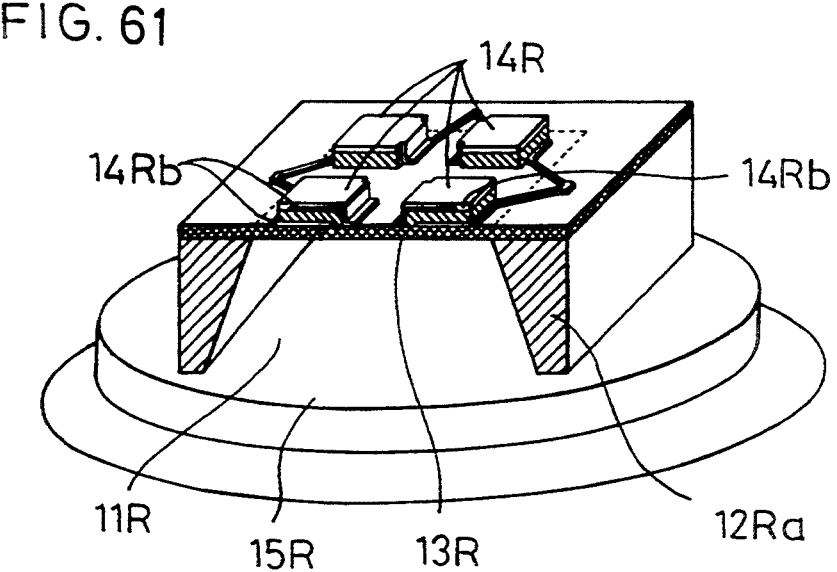
FIG. 61 is a perspective view of the element shown in FIG. 60.
Figure 62:
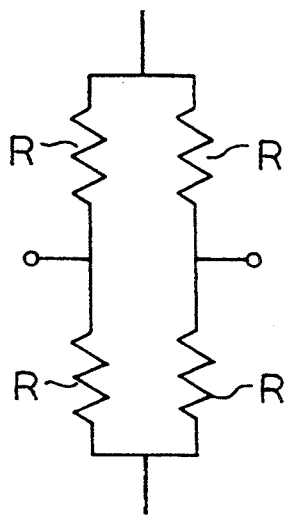
FIG. 62 is a circuit diagram equivalent to the element of FIG. 60.
Figure 63:
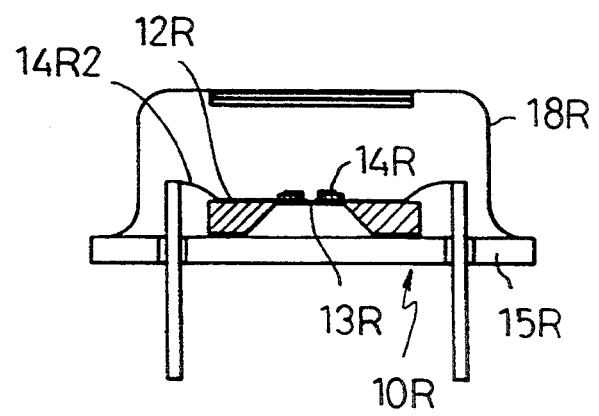
FIG. 63 shows in a schematic view a state in which the element of FIG. 60 is assembled into the infrared detecting device.

In another embodiment shown in FIGS. 60 and 61 of the type where the infrared detector is divided into parts, at least two of the divided parts of the detector 14R are disposed on the thinner part 12R$b$ (or the heat insulation film 13R) to be on each cavity 11R provided in the substrate 12R. In FIG. 62, an equivalent circuit of this embodiment is shown, and FIG. 63 shows schematically the entire structure of the infrared detecting device coupled to the hermetically sealed chamber 18R with the infrared detector 14R disposed in the interior space of the chamber 18R. With such simpler arrangement, in particular, the infrared detecting device which is not influenced by external, ambient conditions and is high in the sensitivity to the infrared can be realized.

In the respective embodiments shown in FIG. 47, FIGS. 50 and 51, FIGS. 57 and 58, FIG. 59 and FIGS. 60 and 61, the same constituents as those in the foregoing embodiment of FIGS. 1 to 3 are denoted by the same reference numerals as those used in FIGS. 1 to 3, but with a suffix "O", "P", "Q" or "R" added, and all other arrangements than those described in the above are substantially the same as those described, to attain the same functions.

Figure 64:
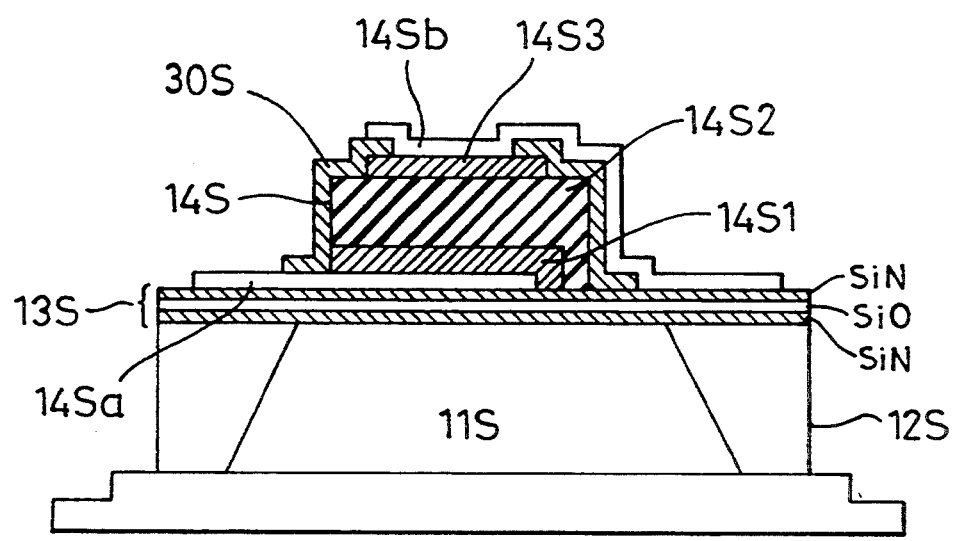
FIG. 64 shows in a sectioned view still another embodiment of the infrared detecting element employable in the device of FIG. 1.

In a further embodiment shown in FIG. 64 according to the present invention, the thermally infrared absorbing film 13S provided on the substrate 12S having the cavity 11S is formed with a multilayered structure of laminated films of silicon oxide and silicon nitride. On this heat insulation film 13S, the infrared detector 14S is formed in the sandwich structure of holding the amorphous silicon carbide layer 14S2 between the lower and upper amorphous silicon layers 14S1 and 14S3 of the single-element semiconductor thin films. If required, the infrared detector 14S is covered with a protective layer 30S. The ohmic electrodes 14Sa and 14Sb of chromium Cr, for example, are provided respectively between the heat insulation film 13S and the infrared detector 14S and on the top of the detector 14S. In this case, the respective constituents of the infrared detector 14S are formed through the same steps and in the same thickness or the like dimension as those adopted in any one of the foregoing embodiments.

In addition, in the present instance of FIG. 64, any leak current likely to occur between the amorphous silicon carbide layer 14S2 and both side ohmic electrodes 14Sa and 14Sb is attempted to be reduced by, for example, omitting both end parts of the upper side amorphous silicon layer 14S3, whereby any noise caused by the leak current can be sufficiently prevented and eventually the detecting sensitivity can be effectively improved.

In the embodiment of FIG. 64, the same constituents as those in the embodiment of FIGS. 1 to 3 are denoted by the same reference numerals as those used in FIGS. 1 to 3 but with a suffix "S" added, and any other constituents than those above described are substantially the same as corresponding ones in FIGS. 1 to 3 and attain the same functions.

What is claimed is:

1. An infrared detecting device comprising a hermetically sealed casing and an infrared detecting element accommodated in said casing, wherein the infrared detecting element comprises a substrate having a cavity defined therein, a heat insulation film provided on the substrate, an infrared detector provided on the heat insulation film to be disposed between interior space of the casing and the cavity in the substrate, and means for communicating interior space of the cavity defined in the substrate with the interior space of the casing, said communicating means being provided for maintaining a pressure difference between the interior space of the cavity in the substrate and the interior space of the casing to be less than a predetermined value.

2. The device according to claim 1, wherein the hermetically sealed casing is charged with gaseous matter other than air and having a low thermal conductivity.

3. The device according to claim 1, where in the interior space of the hermetically sealed casing is in a vacuumed state.

4. The device according to claim 1, wherein the infrared detector includes a thermistor and means covering the thermistor for absorbing infrared light, said infrared absorbing means consisting essentially of silicon oxynitride.

5. An infrared detecting element comprising a substrate having therein a cavity, a heat insulation film provided on the substrate, and an infrared detector provided on the heat insulation film at a position corresponding to the cavity in the substrate, said infrared detector including a thermistor, a set of electrodes connected to the thermistor, and a covering infrared absorbing film provided on the thermistor and consisting essentially of silicon oxynitride.

6. The element according to claim 5, wherein the thermistor consists of amorphous silicon carbide.

7. The element according to claim 5, wherein the infrared detector is rounded at corner parts.

8. The element according to claim 5, wherein the covering infrared absorbing film is divided by partition slits.

9. The element according to claim 5, wherein the infrared detector is divided into parts, at least two of the divided parts are provided on the heat insulation film at a position corresponding to the cavity in the substrate.

10. A thermistor comprising an amorphous alloy semiconductor thin film, and a pair of upper and lower single element semiconductor thin films holding between them said amorphous alloy semiconductor thin film.

11. The thermistor according to claim 10, wherein said single element semiconductor thin films are of a conduction type opposite to the amorphous alloy semiconductor thin film.

12. The thermistor according to claim 10, wherein a buffer layer is provided between said amorphous alloy semiconductor thin film and said upper and lower single element semiconductor thin films.

13. The thermistor according to claim 10, wherein said upper side single element semiconductor thin film is omitted at both side portions.

* * * * *